(12) United States Patent
Moriat et al.

(10) Patent No.: US 8,527,964 B2
(45) Date of Patent: Sep. 3, 2013

(54) MEASUREMENT PROJECT ANALYZER

(75) Inventors: Alain G. Moriat, Copenhagen (DK); Patrick J. Christmas, Boulder, CO (US)

(73) Assignee: National Instruments Corporation, Austin, TX (US)

( * ) Notice: Subject to any disclaimer, the term of this patent is extended or adjusted under 35 U.S.C. 154(b) by 1380 days.

(21) Appl. No.: 11/757,674

(22) Filed: Jun. 4, 2007

(65) Prior Publication Data

US 2008/0300697 A1    Dec. 4, 2008

(51) Int. Cl.
*G06F 9/44* (2006.01)

(52) U.S. Cl.
USPC .......................................................... 717/131

(58) Field of Classification Search
USPC .......................................................... 717/131
See application file for complete search history.

(56) References Cited

U.S. PATENT DOCUMENTS

| | | | | |
|---|---|---|---|---|
| 6,026,362 A | * | 2/2000 | Kim et al. | 705/317 |
| 6,275,223 B1 | * | 8/2001 | Hughes | 715/751 |
| 2003/0004670 A1 | * | 1/2003 | Schmit et al. | 702/123 |
| 2005/0034106 A1 | * | 2/2005 | Kornerup et al. | 717/132 |
| 2005/0257203 A1 | * | 11/2005 | Nattinger | 717/154 |
| 2008/0109687 A1 | * | 5/2008 | Abernathy et al. | 714/704 |

FOREIGN PATENT DOCUMENTS

CA    2164335    * 1/1995

* cited by examiner

*Primary Examiner* — Li B Zhen
*Assistant Examiner* — Lenin Paulino
(74) *Attorney, Agent, or Firm* — Meyertons Hood Kivlin Kowert & Goetzel, P.C.; Jeffrey C. Hood; Mark S. Williams

(57) ABSTRACT

System and method for creating a measurement application. User input specifying a sequence of functions implementing a measurement application is received, where the sequence of functions are executable to perform a specified task utilizing one or more hardware devices, and where the user input further specifies the hardware devices. Configuration of the measurement application is automatically analyzed according to rules specifying operation of the sequence of functions and the hardware devices. One or more errors in the measurement application are automatically determined based on the analyzing, and error information regarding the errors is displayed on a computer display, where the error information is usable to modify the measurement application to correct the one or more errors. In response to the error information, user input modifying the measurement application to correct the one or more errors may be received and/or the measurement application may be automatically modified to correct the errors.

25 Claims, 14 Drawing Sheets

MEASUREMENT PROJECT ANALYZER

FIELD OF THE INVENTION

The present invention relates to the field of measurements, and more particularly to a system and method for automatically analyzing the configuration of a measurement application.

DESCRIPTION OF THE RELATED ART

In some measurement applications, e.g., signal analysis applications, such as test and measurement, control, simulation, and equipment design applications, among others, the application may be specified to utilize various functions and instruments or other devices to perform a measurement task, e.g., to analyze various signals or data related to a phenomenon, e.g., a unit under test (UUT), where the term signal "analysis" also includes signal "processing". The coordinated configuration and use of these functions and instruments to perform the desired task of the application generally requires coordinated configuration of the functions and devices, including setting numerous parameters correctly, before the application will operate properly, and is often tedious, time-consuming, and error prone, and thus may be frustrating to the user, and may lessen the user's confidence in the application results.

Thus, improved systems and methods for developing measurement applications are desired.

SUMMARY OF THE INVENTION

Various embodiments of a system and method for developing a measurement application are provided.

First, user input specifying a sequence of functions implementing a measurement application may be received. The sequence of functions may be executable to perform a specified task utilizing one or more hardware devices. In one embodiment, the user input further specifies the one or more hardware devices. In other words, one or more of these functions may be associated with a corresponding hardware device, which the user may also specify, e.g., separately from the function, or as part of the function specification/configuration. For example, in a preferred embodiment, the user input may be received to a graphical user interface (GUI) of an application development environment, e.g., a signal analysis function development environment, which may facilitate interactive specification, development, and execution of signal analysis functions.

The signal analysis function development environment may provide an integrated graphical interface for a plurality of instruments for signal analysis. The signal analysis function development environment may execute on a computer system that includes a display, i.e., a display device, such as a computer monitor, which operates to display the GUI. The GUI preferably includes a display window or panel for displaying signals and signal analysis results (from the functions). While some embodiments of the invention are described herein in the context of signal analysis functions, the techniques disclosed herein are contemplated as being broadly applicable for other types of systems and application domains, as well. Thus, while the method is presented in terms of a measurement application for signal analysis, other types measurement applications are also contemplated. For example, in one embodiment, the measurement application may include at least one data acquisition function and at least one analysis function. In another embodiment, the measurement application may be executable to perform one or more of: one or more control operations, one or more automation operations, or one or more modeling or simulation operations. In other embodiments, any other measurement-related functionality may be included as desired.

The user may specify the functions in any of a variety of ways. For example, in one embodiment the user may select (e.g., with a pointing device, such as a mouse) the functions from a menu. For example, a menu of selectable functions may be provided by the signal analysis function development environment, e.g., from a menu bar, where, as mentioned above, signal analysis also includes signal processing. In another embodiment the user may select the functions from a palette of function icons, where each function icon represents a respective function. For example, the user may double click on the icon for a function, thereby invoking a configuration GUI for the function through which the user may provide input configuring the function. As another example, the user may "drag and drop" the icon from the palette onto a diagram, active window, and/or another icon. In one embodiment, each function icon may be associated with or comprised in a respective function block, described below in detail. Similar to above, in one embodiment, the palette may be displayed in response to user input selecting a signal plot or signal icon from a display tool, e.g., a graphical display, of the signal analysis function development environment. It is noted that other methods of selecting the function are also contemplated, such as, for example, the user entering the name of the desired function into a text entry field, although graphical selection methods are preferred.

In one embodiment, a GUI may provide an interface for the signal analysis function development environment. In preferred embodiments, the measurement application may be development under a project organized and managed within the development environment. The GUI may include an area or window for displaying a plurality of function blocks, where, as noted above, selected function blocks may be displayed in this window, where the displayed function blocks may each correspond to a respective function (e.g., a signal function) that has been selected by a user and thus represent the currently specified functions, where each function block may have an icon, a label, and icons for input and/or output signals.

In one exemplary embodiment, the user may select a function for the measurement application via the GUI, e.g., by invoking an "Add Step" (the term "step" refers to a function or function block) or equivalent operation from a toolbar, and selecting a function from a menu (in this case, a hierarchical menu of operations grouped by functional category), although any other selection means may be used as desired, e.g., palettes, text entry, etc. In preferred embodiments, the user may configure the selected function, e.g., via one or more configuration panels, dialogs, tabs, menus, etc. In other words, receiving respective user input specifying the function may also include displaying configuration options for the measurement application, where the configuration options are displayed in accordance with the plurality of rules, and receiving user input selecting one or more options for the measurement application.

In preferred embodiments, a display area or window of the GUI may be provided (shown to the right of the function block display area) for displaying measurement or analysis signals and related data. The display of the GUI may be used to display signal graphs, as well as tabular data, i.e., tables of data.

The plurality of function blocks corresponding to the sequence of functions are preferably included in a function block diagram, where the plurality of function block icons may be arranged to visually indicate the functionality of the measurement application. In other words, in one embodiment, a diagram including the function block icons of the specified functions is displayed, where the diagram visually indicates the functionality of the measurement application. In various embodiments, the diagram may be one or more of: a linear sequence, a data flow diagram, a tree diagram, and a dependency diagram.

Thus, in preferred embodiments, for each function in the sequence of functions, the method may include displaying an icon on the display in response to receiving respective user input specifying the function, where the icon is or includes a graphical representation of the function.

It should also be noted, however, that although the diagram may be presented as a linear sequence, in some embodiments, the I/O relationships between the function blocks may not be linear. For example, non-linear data flow may be specified and indicated via input and output signal icons for the function blocks. In one embodiment, the function block diagram may be a data flow diagram, although in other embodiments, the function block diagram may not follow data flow semantics. For example, other flow protocols or semantics may be used, e.g., control flow, execution flow, etc., as desired. Additionally, in some embodiments, no lines or connections may be displayed connecting the function blocks, although in other embodiments, the function blocks may be connected by wires illustrating and/or implementing communication between the function blocks.

Note, however, that in some embodiments, no hardware devices may be used, e.g., in some simulation or modeling applications, or offline or post-processing projects that do not include any hardware blocks. The measured signals may, for example, originate from data logged on file, e.g., data may be "acquired" by the application from a file, rather than via a DAQ device (although the data may or may not have been originally acquired via a hardware device). Additionally, in some embodiments, the application or project may be a pure simulation project that does not require any input signal at all (neither from acquisition hardware nor from a data file).

Thus, in some embodiments, there may be no hardware function blocks in the measurement project or application. In other software only embodiments, the function blocks may operate to analyze (possibly including data or signal processing) data (or signals) that have already been acquired, e.g., digitized, and stored on a computer system, and so may not require the use of hardware devices.

The configuration of the measurement application may automatically be analyzed according to a plurality of rules specifying operation of the sequence of functions and the one or more hardware devices. In other words, the sequence of functions (possibly including any associated devices) may be analyzed with respect to configuration based on rules related to the operation of the sequence of functions and the hardware devices. In one embodiment, the automatically analyzing may include one or more of: analyzing at least one of the sequence of functions, analyzing parameter settings for the one or more hardware devices, and/or analyzing device specifications (e.g., parameter values) for the one or more hardware devices.

It should be noted that the analysis is performed with respect to user-provided selection of, configuration of, or attribute specifications for, the sequence of functions, and thus may be considered to be performed by a project configuration analyzer or "edit-related" analyzer, since all the configuration information analyzed is available at "edit-time" for the application. In other words, the analysis is directed to the configuration of the application and/or user input specifying such configuration. This is in contrast to analysis of "run-time" phenomena, which, as used herein, refers to analysis directed to signals or data produced during operation or execution of the sequence of functions, i.e., at run-time, e.g., an analysis that considers, for example, the nature of acquired signals received from a UUT during execution of the function sequence. Note, however, that while operating in continuous mode, the user may edit the sequence of functions, e.g., adding or removing function blocks, configuring function blocks, etc., while the sequence is running; and so the analyzer may analyze the data input by the user, as well as the resulting configuration of the function sequence, which, although the function sequence may be running, is still considered to be an configuration or edit-related analysis, since it is the configuration or edit-related aspects of the system being analyzed, as opposed to phenomena generated or received during or as a result of the run-time operation of the system.

For example, in one embodiment, the parameter settings of the measurement application (e.g., of the project), possibly including hardware parameters, and other high-level dependencies between the specified functions or function blocks may be analyzed according to the specified rules. In some embodiments, the rules may be part of, or associated with, the related functions, and so may be stored and managed as part of the functions and/or the development environment, e.g., as a set of files, or in a library, e.g., a DLL (dynamic linked library). Additionally or alternatively, the rules may be maintained separately, e.g., provided (e.g., shipped) as independent files, e.g., as a separate library, DLL, etc.

In some embodiments, a GUI tool (e.g., within the development environment, or external to the environment), e.g., a rule editor, may be provided whereby the user may create their own rules governing the operation of functions. Thus, the user may create their own rules for analyzing their tasks in accordance with both internal rules and "custom" rules. For example, in one exemplary embodiment, the rule editor may include a text window or field for specifying or writing a formula codifying the desired rule. In some embodiments, this formula window or field may be automatically populated via user-selection of elements in other windows. For example, the user may select various operations from lists, menus, or palettes, e.g., by clicking function names, logical operators, and so forth. Additionally or alternatively, the user may simply type desired items, e.g., function names and operations, directly into the window or field, e.g., in accordance with a specified convention or programming/logical language. In one embodiment, the text of the formula may be automatically checked for 'correctness', e.g., the syntactic (and type) validity of the statement may be determined, and any problems or errors may be indicated, e.g., erroneous or problem elements or statements may be underlined, highlighted, or otherwise indicated, as desired.

One or more errors in the measurement application may be automatically determined based on the analyzing. The errors may include any condition or aspect of the measurement application (or associated hardware) that is non-workable or even sub-optimal, e.g., incompatible or non-optimal function or device use, inappropriate parameter values, and so forth. For example, automatically determining one or more errors may include determining one or more parameter conflicts of the sequence of functions and/or the one or more hardware devices. As another example, in an embodiment where at least two functions of the sequence of functions have a specified dependency, automatically analyzing the measurement application may include analyzing the at least two functions with respect to the specified dependency, and automatically determining one or more errors may include determining improper cooperative use of the at least two functions based on the specified dependency.

As indicated above, in some embodiments, the method may detect sub-optimal function/device use or configurations in the measurement application. For example, in an embodiment where two or more of the sequence of functions are specified to operate cooperatively, automatically analyzing the measurement application may include analyzing the two or more functions with respect to the specified cooperative operation, and automatically determining one or more errors may include determining one or more settings for the two or more functions resulting in sub-optimal cooperative operation of the two or more functions. As a further example, automatically analyzing the measurement application may include analyzing the sequence of functions and/or the one or more hardware devices with respect to the specified task, and automatically determining one or more errors may include determining that the sequence of functions and/or the one or more hardware devices are sub-optimal for performing the specified task. Of course, any other errors or types of errors may be determined as desired, the above errors being exemplary only.

Error information regarding the one or more errors may be displayed on a computer display, where the error information is usable to modify the measurement application to correct the one or more errors. The error information may include any information related to the errors that may be useful in correcting the error. For example, in one embodiment, the error information may include one or more of: identification information for the one or more errors, descriptive information regarding the one or more errors, and/or one or more suggested actions to correct the one or more errors.

In some embodiments, the method may include receiving user input modifying the measurement application to correct the one or more errors in response to displaying the error information. For example, embodiment, a dialog also displays options (e.g., buttons at the bottom of the dialog) that may allow the user to invoke an automatic solution for the problem (a fix button), invoke the configuration page to fix the problem (a show error button), or dismiss the dialog (a close button). Note that the fix and show error functionalities may have some inherent ambiguity. For example, because every rule is based on the interaction of multiple functions, it may be ambiguous as to where the problem should be corrected. Thus, in some embodiments, the author of the rule may specify or provide a potential or candidate approach or action to correct the problem (as well as indicating which function should be corrected) for these buttons to operate on. In one embodiment, hyperlinks may be provided that may perform a "go to" operation for each hyperlinked function, where each function may have a respective independent 'fix' option. In some embodiments, the dialog or list may be moved off to the side of the GUI, and the user may continue to work, using the displayed information as a reference.

In one embodiment, the method may include automatically modifying the measurement application to correct the one or more errors in response to said determining one or more errors. For example, as described above, the measurement application may be automatically corrected in response to user input, e.g., in response to the user pressing a "fix" button. Alternatively, in some embodiments, the measurement application may be automatically corrected without invocation of the corrective action by the user. In a further embodiment, the user may correct the problem or error manually, possibly based on hints or suggestions provided by the analyzer. In yet another embodiment, the method may include suggesting one or more functions to replace at least one function in the sequence of functions, or even suggesting a new sequence of functions to replace the entire sequence of functions. In other words, the method may suggest replacing the current sequence entirely, or replacing at least a portion of the sequence with alternative function blocks.

Once the one or more errors are corrected, the measurement application may be executed to perform the task.

BRIEF DESCRIPTION OF THE DRAWINGS

A better understanding of the present invention can be obtained when the following detailed description of the preferred embodiment is considered in conjunction with the following drawings, in which.

Figure 1A:
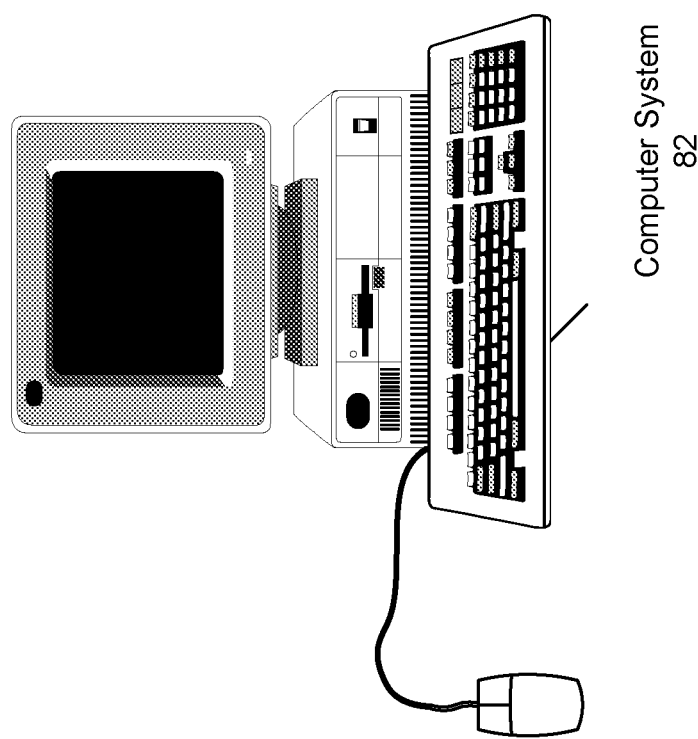
FIG. 1A illustrates a computer system operable to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. application Ser. No. 10/809,107, titled "A Mixed Signal Analysis System and Method of Use", filed Mar. 25, 2004.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes or blocks are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code or data that implements functionality of the node. Exemplary nodes (or blocks) include function nodes, sub-program nodes, terminal nodes, structure nodes, etc. Nodes may be connected together in a graphical program by connection icons or wires.

Graphical Data Flow Program (or Graphical Data Flow Diagram)—A graphical program or diagram comprising a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ (data acquisition) or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Measurement Project—a measurement project (which may also be or include a measurement application) includes a group, e.g., a sequence, of function blocks, each function block operable to perform some type of analysis function, including, for example, data or signal acquisition, generation, processing, analysis, and so forth. Example function blocks include, but are not limited to:

Create Signal: a function that calculates a user-configured signal, e.g., a sine tone or a square wave signal. This virtual signal may not exist as a physical signal until instantiated, e.g., until it is downloaded to a generation device, such as an Arbitrary Waveform Generator (ARB), and generation is instantiated.

Some exemplary Create Signal configuration parameters may include:

Sample rate: The rate (in samples/s) at which the created signal is defined. This rate is normally also the rate at which the generation device will generate the actual signal.

Record length: The number of signal samples being calculated and exported every time the Create Signal function is called.

Signal frequency: The frequency of the signal (for example sine tone) being created.

N-periods: an option that, when 'checked', may force the number of signal periods for the exported signal to be an integer value. The Signal Frequency may therefore be coerced accordingly.

NI-FGen: an example of a generating device function, such as an arbitrary waveform generator device.

NI-Scope: an example of high-speed acquisition device function, such as a digitizer.

Some exemplary acquisition device configuration parameters may include:

Sample rate: The rate (in samples/s) at which the input signal is being sampled during acquisition.

Record length: The number of signal samples being acquired every time the acquisition function block is called.

Amplitude and Level: a function that returns measurement results, such as the RMS (root mean square) or DC value of the input signal.

Subset and Resample: a function that may optionally extract a signal subset and/or resample the signal to a different user specified sample rate.

Some exemplary resampling parameters may include:

Open interval: an option that specifies whether or not the end of the resampled signal includes information from the last sample time interval of the input signal. This feature may only be applicable for resampling of a single record. Note that 'Open interval' may be defined for a subset unless in 'Optimized for single record' mode.

Frequency Resolution—The lowest signal frequency that can be generated without discontinuities when a signal of a specified record length samples running at a specified sample rate is being either repeatedly generated or acquired. The relationship is:

Frequency Resolution=Sample rate/Record length.

FIG. 1A—Computer System

FIG. 1A illustrates a computer system 82 operable to execute software programs according to various embodiments of the present invention. Embodiments of a method for creating a measurement application are described below. It should be noted that as used herein, the term "measurement application" refers to any type of application that relates to the generation, acquisition, and/or analysis of data (including signals), e.g., for measurement, testing, control, simulation or modeling, design, prototyping, and so forth. Note that as used herein, the term "analysis" also refers to "processing", e.g., data or signal processing.

As shown in FIG. 1A, the computer system 82 may include a display device operable to display a graphical user interface for operation of embodiments of the present invention, including, for example, a development environment for designing and creating measurement applications. Note that the graphical user interface may comprise any type of graphical user interface, e.g., depending on the computing platform. In one embodiment, the measurement application may include a signal analysis application, and the development environment may include a signal analysis system, such as Signal Express™, provided by National Instruments Corporation. Further details regarding such a signal analysis system may be found in U.S. patent Ser. No. 10/809,107, titled "A Mixed Signal Analysis System and Method of Use", which was incorporated by reference above. While some embodiments of the invention are described herein in the context of signal analysis functions, it should be noted that the techniques disclosed herein are contemplated as being broadly applicable for other types of systems and application domains, as well.

The computer system 82 may include at least one memory medium on which one or more computer programs or software components according to one embodiment of the present invention may be stored. For example, the memory medium may store various programs that are executable to perform the methods described herein. Additionally, as indicated above, the memory medium may store a development environment application used to create and/or execute or operate measurement applications, e.g., signal analysis applications. The memory medium may also store operating system software, as well as other software for operation of the computer system. Various embodiments further include receiving or storing instructions and/or data implemented in accordance with the foregoing description upon a carrier medium.

Figure 1B:
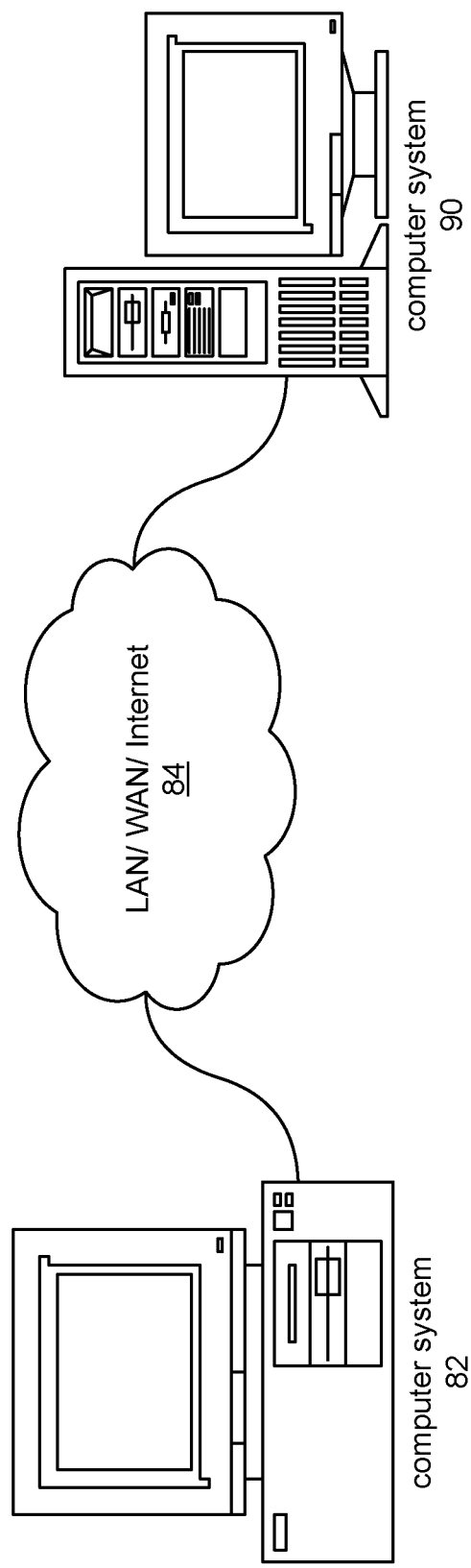
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute software programs implementing embodiments of the present invention in a distributed fashion. For example, computer 82 may execute a first portion of the software, and computer system 90 may execute a second portion of the software. As another example, computer 82 may display a graphical user interface for the systems and methods disclosed herein, and computer system 90 may execute the functional portion of the software, where "functional" refers to those aspects and functions not specifically directed to interfacing with a human user. Of course, any other program distribution scheme may be used as desired.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., applications where signals and/or other data are acquired, produced, and/or analyzed, as well as general purpose software applications such as word processing, spreadsheets, network control, network monitoring, financial applications, games, etc.

Figure 2A:
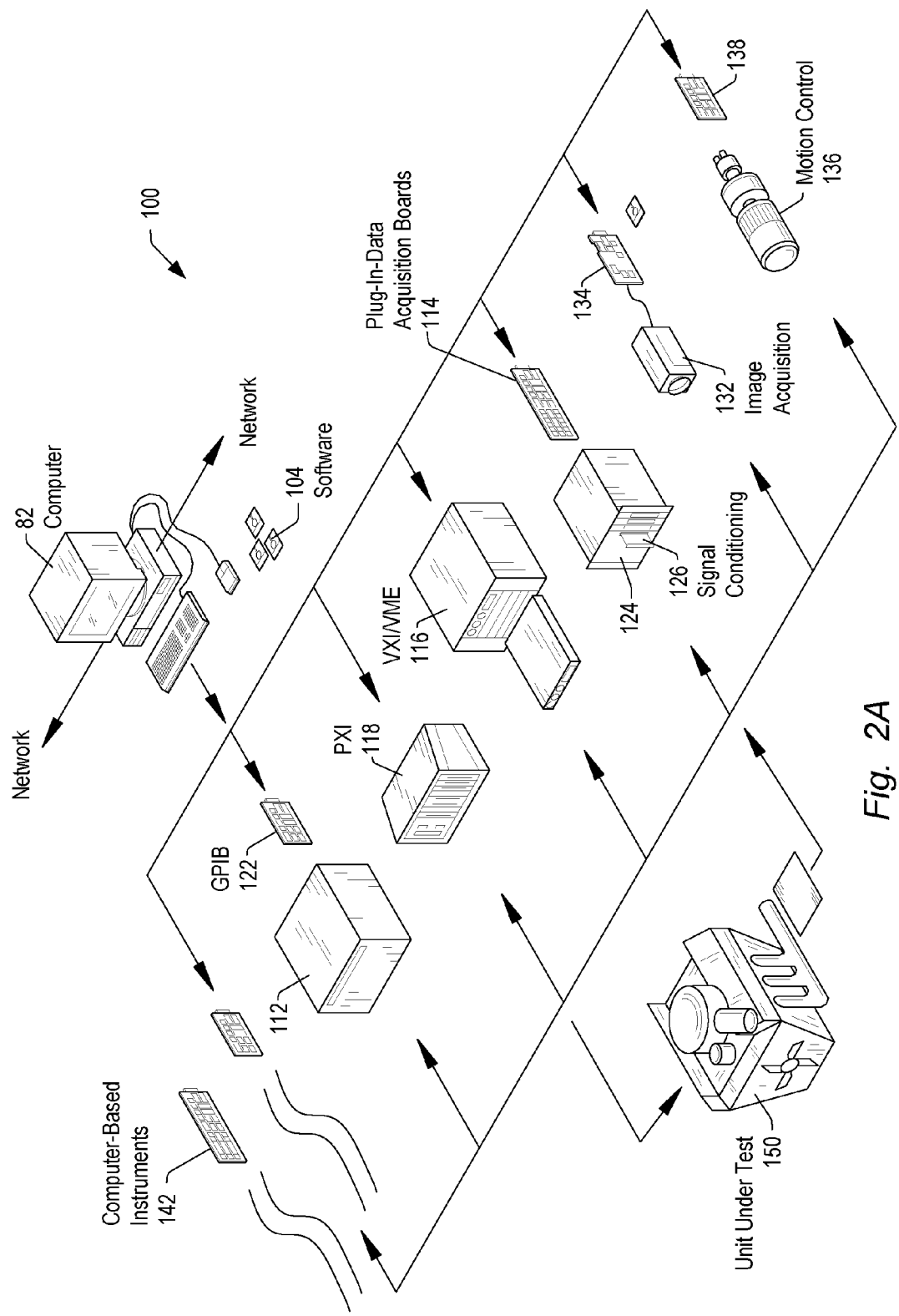
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown.

The computer 82 may operate with the one or more instruments to analyze, measure or control a unit under test (UUT) or process 150. As will be described in detail below, in a preferred embodiment, the computer 82 may execute software that utilizes hardware devices (e.g., boards) and/or instruments coupled to the computer, possibly in conjunction with various virtual instruments (VIs), for signal analysis related to an application, device, or phenomenon.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
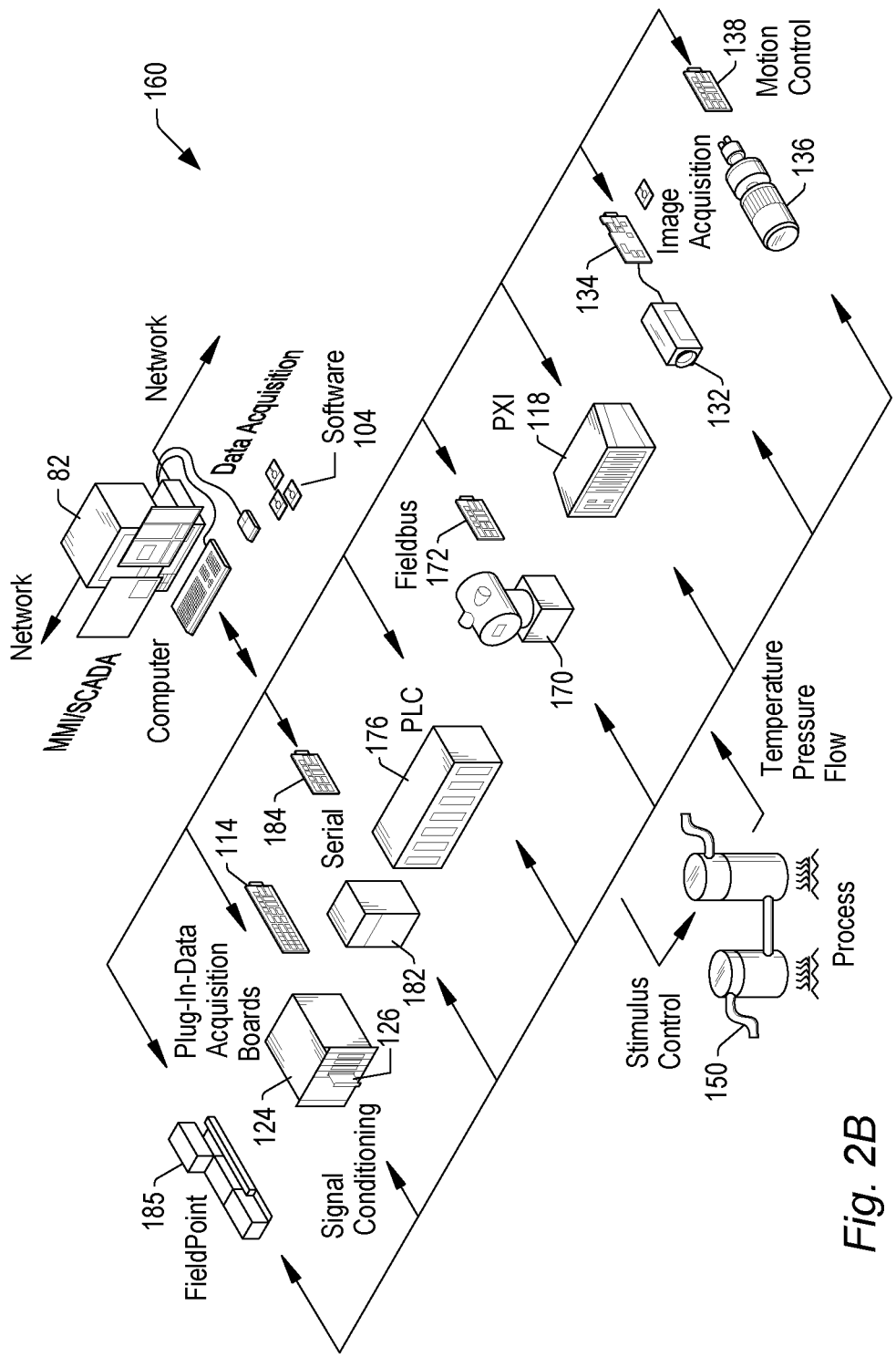
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments Corporation, among other types of devices.

Figure 3A:
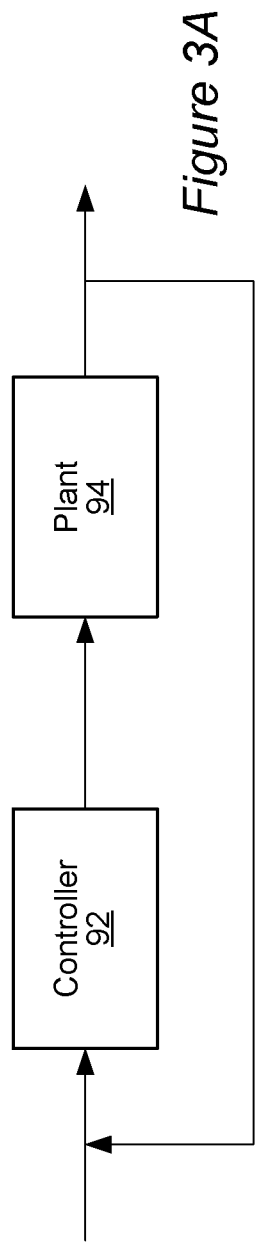
FIG. 3A is a high level block diagram of an exemplary system which may execute or utilize graphical programs.

FIG. 3A is a high-level block diagram of an exemplary system that may execute or utilize graphical programs. FIG. 3A illustrates a general high-level block diagram of a generic control and/or simulation system that includes a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

The user may then specify and/or execute a function, e.g., a signal analysis function, to perform various tests and measurements (analyses) on the model, the controller 92, and/or the plant 94, e.g., via one or more software programs implementing various embodiments of the present invention, e.g., via a signal analysis function development environment (and possibly associated tools, plug-ins, etc.), which may facilitate interactive specification, development, testing, and execution of signal analysis functions.

Figure 3B:
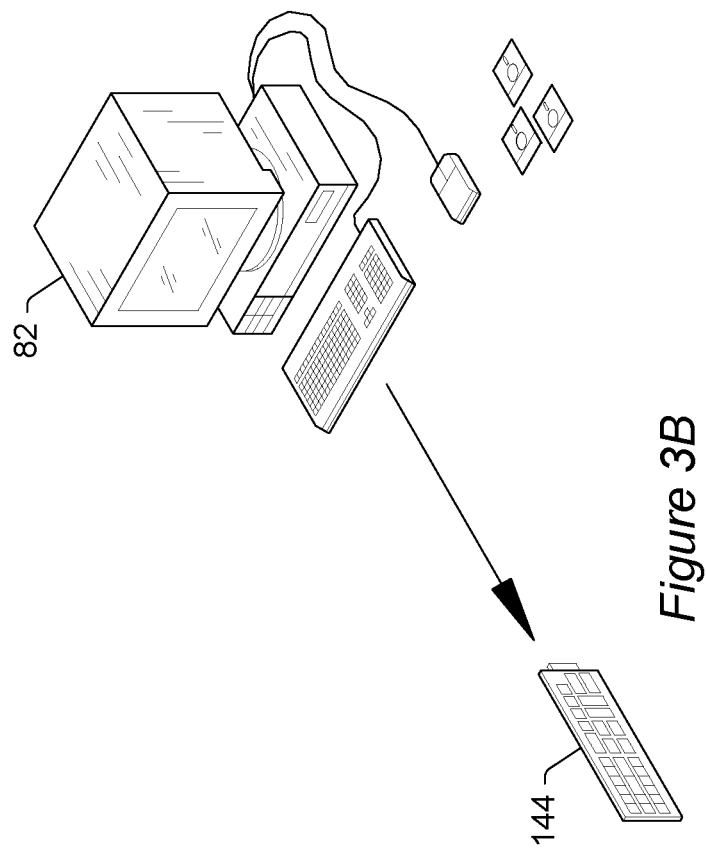
FIG. 3B illustrates an exemplary system which may perform control and/or simulation functions utilizing graphical programs.

FIG. 3B illustrates an exemplary system that may perform control and/or simulation functions. As shown, the controller 92 may be implemented by a computer system 82 or other device (e.g., including a processor and memory medium and/or including a programmable hardware element) that executes or implements a control program, e.g., a graphical program. In a similar manner, the plant 94 may be implemented by a computer system or other device 144 (e.g., including a processor and memory medium and/or including a programmable hardware element) that executes or implements a control program, or may be implemented in or as a real physical system, e.g., a car engine.

In one embodiment of the invention, one or more programs may be created (e.g., as part of a measurement application project) which are used in performing rapid control prototyping. Rapid Control Prototyping (RCP) generally refers to the process by which a user develops a control algorithm and quickly executes that algorithm on a target controller connected to a real system. For example, the user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user may select a target device from a plurality of possible target devices for programming or configuration using software according to embodiments of the present invention, e.g., a graphical program, executive measurement or analysis sequence, and so forth. Thus the user may create a graphical program or executive sequence on a computer and use (execute) the graphical program or executive sequence on that computer or deploy the graphical program or executive sequence to a target device (for remote execution on the target device) that is remotely located from the computer and coupled to the computer through a network. One or more programs or program portions according to embodiments of the present invention may execute on the computer (e.g., host computer) and/or on the target device, as desired.

Note that graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
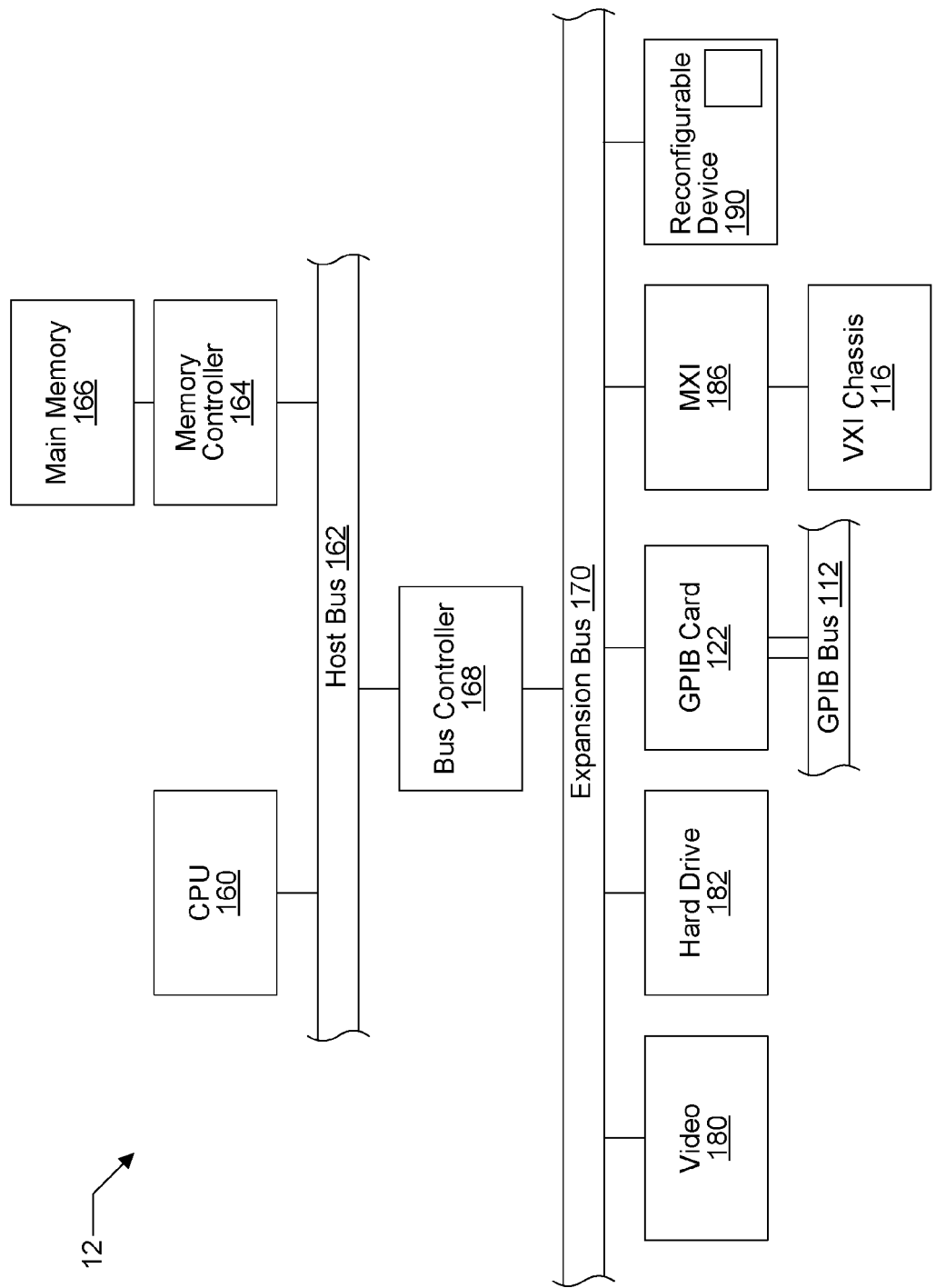
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general-purpose computer system, a computer implemented on a card installed in a chassis, or other types of embodiments. Elements of a computer not necessary to understand the present description have been omitted for simplicity.

The computer may include at least one central processing unit or CPU (processor) 160, which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. As noted above, the main memory 166 may store the one or more computer programs or software components according to one embodiment of the present invention. For example, the memory medium may store various programs that are executable to perform the methods described herein. Additionally, as also indicated above, the memory medium may store a development environment application used to create and/or execute or operate measurement applications, e.g., signal analysis applications. The memory medium may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, in some embodiments, a device 190 may also be connected to the computer. The device 190 may include a processor and memory that in some embodiments may execute a real time operating system. The device 190 may also or instead comprise a programmable hardware element. The computer system may be operable to deploy a graphical program or executive sequence to the device 190 for execution on the device 190. The deployed program or executive sequence may take the form of graphical program instructions or data structures that directly represent the graphical program or executive sequence. Alternatively, the deployed graphical program or executive sequence may take the form of text code (e.g., C code) generated from the graphical program or executive sequence. As another example, the deployed graphical program or executive sequence may take the form of compiled code generated from either the graphical program/executive sequence, or from text code that in turn was generated from the graphical program/executive sequence.

FIG. 5—Flowchart

Figure 5:
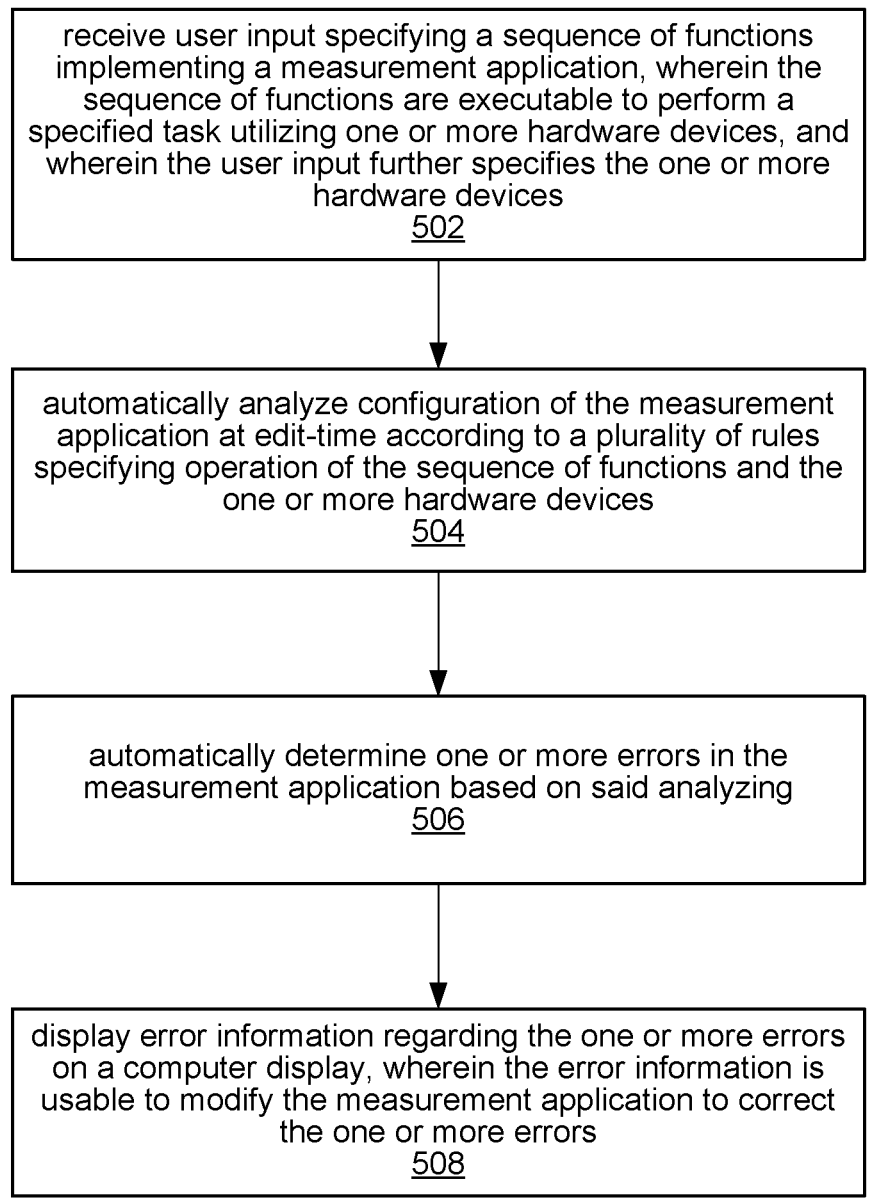
FIG. 5 is a flowchart diagram illustrating one embodiment of a method for creating a measurement application.

FIG. 5 illustrates embodiments of a method for creating a measurement application, e.g., for performing a measurement function. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502, user input specifying a sequence of functions implementing a measurement application may be received. The sequence of functions may be executable to perform a specified task utilizing one or more hardware devices. In one embodiment, the user input further specifies the one or more hardware devices. In other words, one or more of these functions may be associated with a corresponding hardware device, which the user may also specify, e.g., separately from the function, or as part of the function specification/configuration.

For example, in a preferred embodiment, the user input may be received to a graphical user interface (GUI) of an application development environment, e.g., a signal analysis function development environment, which may facilitate interactive specification, development, and execution of signal analysis functions. The signal analysis function development environment may provide an integrated graphical interface for a plurality of instruments for signal analysis, examples of which are described below with reference to FIGS. 6-12. The signal analysis function development environment may execute on a computer system that includes a display, i.e., a display device, such as a computer monitor, which operates to display the GUI. The GUI preferably includes a display window or panel for displaying signals and signal analysis results (from the functions). Further details regarding such a signal analysis function development environment may be found in U.S. patent Ser. No. 10/809,107, titled "A Mixed Signal Analysis System and Method of Use", which was incorporated by reference above. As noted above, while some embodiments of the invention are described herein in the context of signal analysis functions, the techniques disclosed herein are contemplated as being broadly applicable for other types of systems and application domains, as well. Thus, while the method of FIG. 5 is presented in terms of a measurement application for signal analysis, other types measurement applications are also contemplated. For example, in one embodiment, the measurement application may include at least one data acquisition function and at least one analysis function. In another embodiment, the measurement application may be executable to perform one or more of: one or more control operations, one or more automation operations, or one or more modeling or simulation operations. In other embodiments, any other measurement-related functionality may be included as desired.

The user may specify the functions in any of a variety of ways. For example, in one embodiment the user may select (e.g., with a pointing device, such as a mouse) the functions from a menu. For example, a menu of selectable functions may be provided by the signal analysis function development environment, e.g., from a menu bar, where, as mentioned above, signal analysis also includes signal processing. In another embodiment the user may select the functions from a palette of function icons, where each function icon represents a respective function. For example, the user may double click on the icon for a function, thereby invoking a configuration GUI for the function through which the user may provide input configuring the function. As another example, the user may "drag and drop" the icon from the palette onto a diagram, active window, and/or another icon. In one embodiment, each function icon may be associated with or comprised in a respective function block, described below in detail. Similar to above, in one embodiment, the palette may be displayed in response to user input selecting a signal plot or signal icon from a display tool, e.g., a graphical display, of the signal analysis function development environment. It is noted that other methods of selecting the function are also contemplated, such as, for example, the user entering the name of the desired function into a text entry field, although graphical selection methods are preferred.

Figure 6:
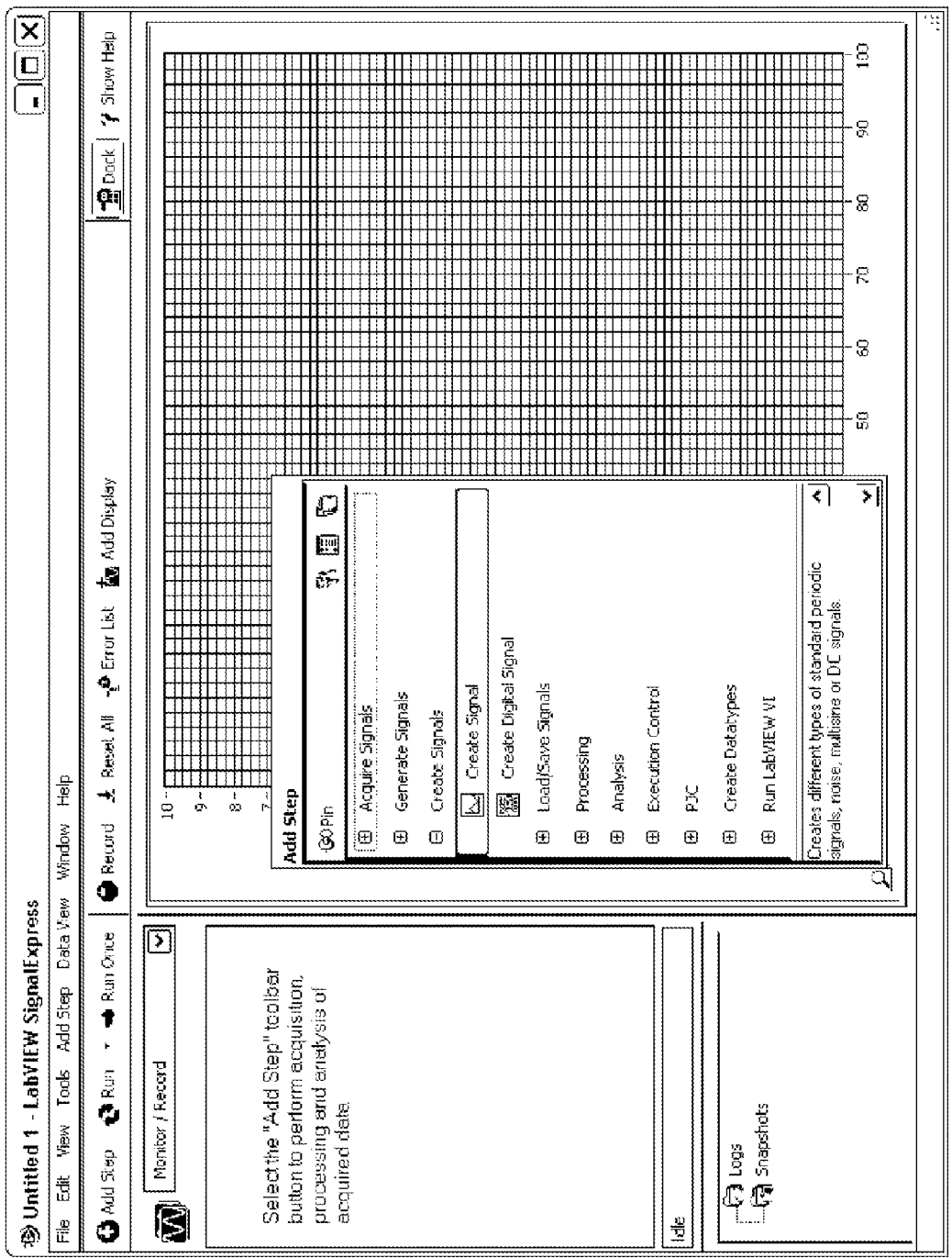
FIG. 6 illustrates user-selection of a function for a measurement application via an exemplary graphical user interface (GUI), according to one embodiment.

FIG. 6 illustrates one embodiment of a GUI for developing measurement applications. More specifically, the GUI provides an interface for the signal analysis function development environment mentioned above. Note that the example shown is meant to be exemplary only, and is not intended to limit the GUI to any particular appearance, form, or functionality. In preferred embodiments, the measurement application may be development under a project organized and managed within the development environment.

As may be seen in FIG. 6, the GUI may include an area or window for displaying a plurality of function blocks, here shown as the upper left-most window of the GUI. Selected function blocks may be displayed in this window, where, as described above, the displayed function blocks may each correspond to a respective function (e.g., a signal function) that has been selected by a user and thus represent the currently specified functions, where each function block may have an icon, a label, and icons for input and/or output signals. Note that in the example of FIG. 6, no function blocks have been selected yet, and so the window is empty.

As FIG. 6 shows, in this embodiment, the user may select a function for the measurement application, e.g., by invoking an "Add Step" (the term "step" refers to a function or function block) operation from a toolbar, and selecting a function from a menu (in this case, a hierarchical menu of operations grouped by functional category), although any other selection means may be used as desired, e.g., palettes, text entry, etc. As may be seen, the user is selecting a Create Signal function for creating a signal that may be generated with a function generator (to be selected later). In other words, the Create Signal function may generate data that specifies or simulates a desired signal that may then be used to produce an actual signal via hardware.

Figure 7:
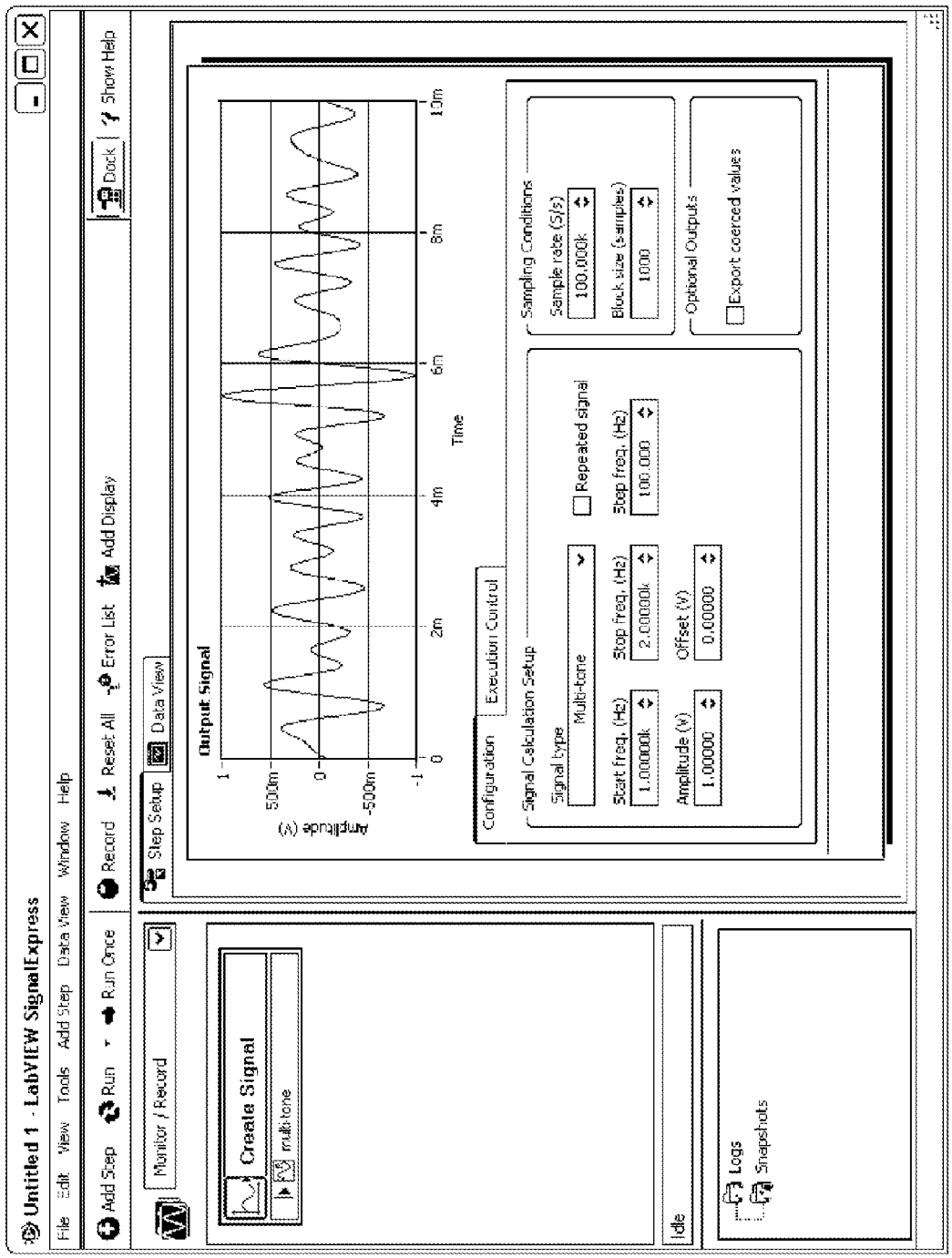
FIG. 7 illustrates configuration of the selected function of FIG. 6, according to one embodiment.

In preferred embodiments, the user may configure the selected function, e.g., via one or more configuration panels, dialogs, tabs, menus, etc. In other words, receiving respective user input specifying the function may also include displaying configuration options for the measurement application, where the configuration options are displayed in accordance with the plurality of rules, and receiving user input selecting one or more options for the measurement application. FIG. 7 illustrates configuration of the Create Signal function via a tabbed "Configuration" panel. In this example, the user configures the function to create a multi-tone signal for performing frequency analysis on a Unit Under Test (UUT), e.g., an external device being tested. Note that the Create Signal function block icon includes an output indicator, shown on the bottom of the function block icon, and labeled "multi-tone", indicating and naming the output of the function block.

In preferred embodiments, a display area or window of the GUI may be provided (shown to the right of the function block display area) for displaying measurement or analysis signals and related data. The display of the GUI may be used to display signal graphs, as well as tabular data, i.e., tables of data. For example, in FIG. 7 the created multi-tone output waveform is displayed in the display area in a window labeled "Output Signal". Note that, as FIG. 7 illustrates, in some embodiments, the functions may begin operation upon selection and inclusion of the function blocks in the function block window, e.g., if the project is set to a continuous execution or operation mode.

Figure 8:
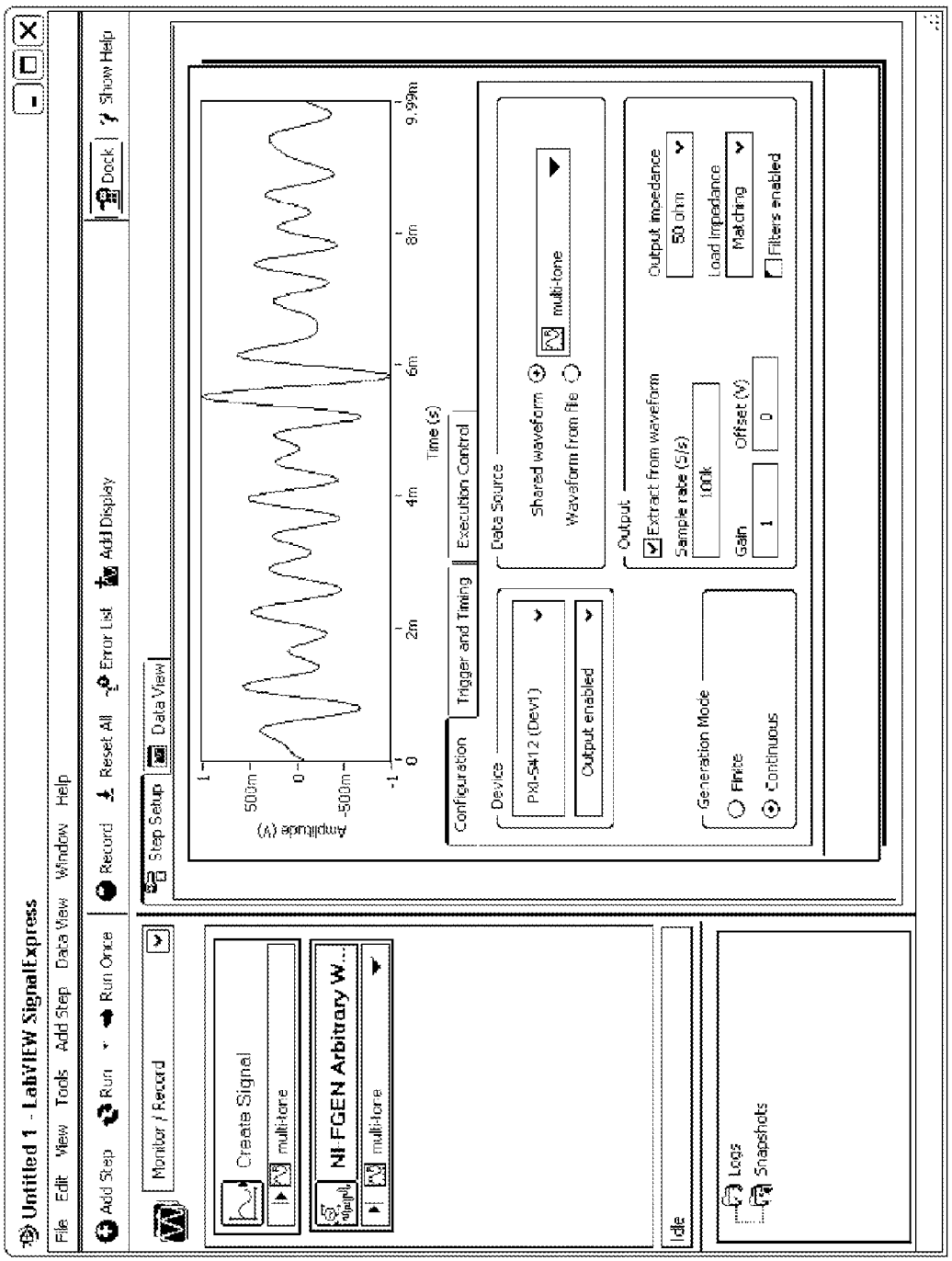
FIG. 8 illustrates user-selection of a second function for the measurement application, according to one embodiment.

FIG. 8 illustrates the GUI of FIGS. 6 and 7, where the user has added a function generation function, specifically, an NI-FGen Arbitrary Waveform Generator function, to configure the hardware generation of the (simulated) signal produced by the Create Signal function. Thus, the NI-FGen Arbitrary Waveform Generator function is an illustrative example of a function that has a corresponding hardware device, in this case, an arbitrary waveform generator that generates a signal as specified by the output of the Create Signal function. Note that the NI-FGen Arbitrary Waveform Generator function block includes an input indicator that specifies and indicates the input source for the function block, in this case, the multi-tone signal.

Figure 9:
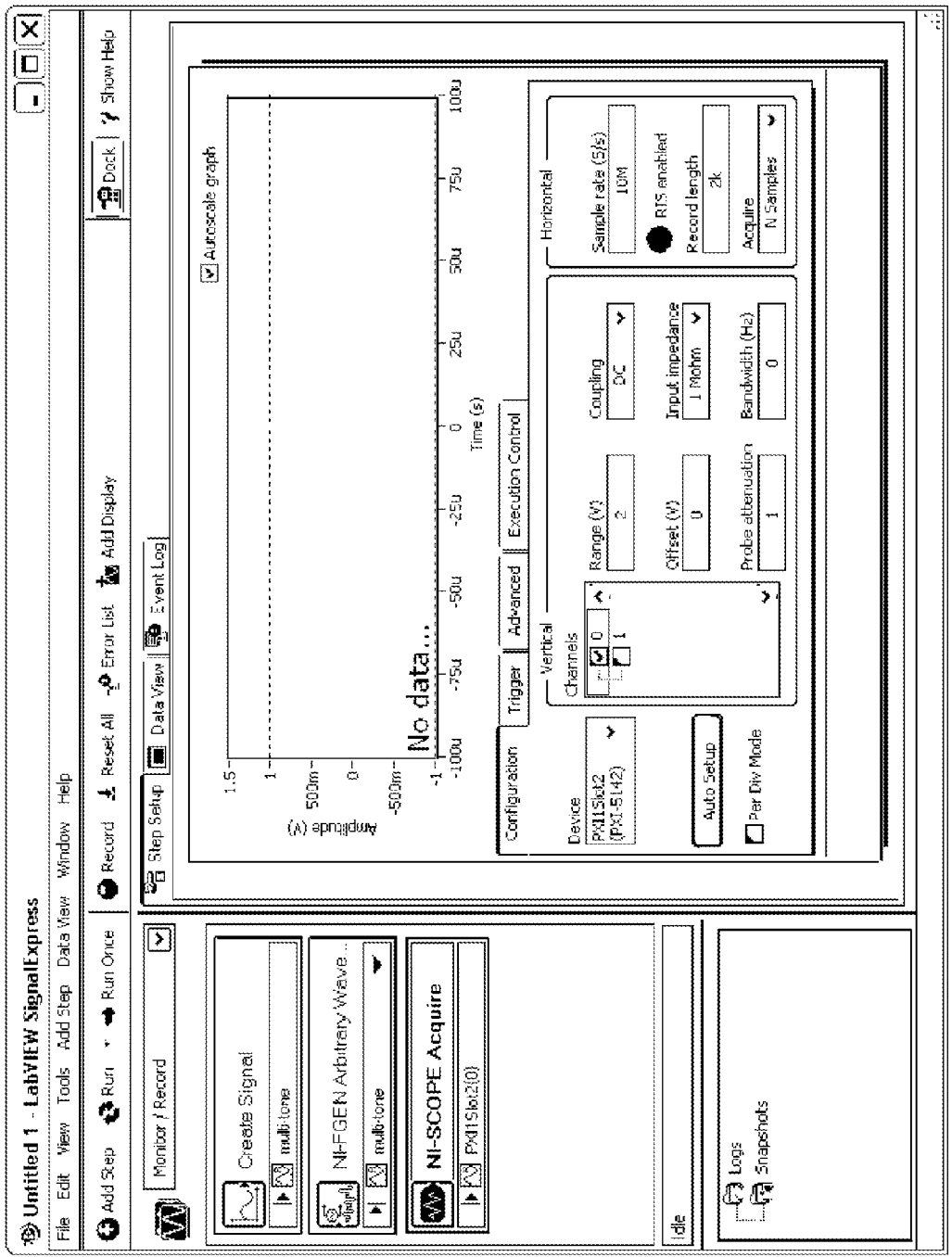
FIG. 9 illustrates user-selection of a third function for the measurement application, according to one embodiment.

FIG. 9 illustrates the GUI after the user has selected an NI-Scope Acquire function block, for acquiring and displaying a signal, e.g., a response signal, from the UUT, e.g., for reacquiring the original signal after it has been passed through the UUT. Note that the function block indicates that output from the function block is named within the project as PXI1Slot2 {0} indicating the device and channel from which the data was acquired. Note further that the signal display window is configured to show an acquired signal, but that no data are currently available, as the project is not currently running. Note that in this example sequence of functions, only the first function block, Create Signal, was explicitly configured by the user; the other function blocks were left in their default configurations, i.e., default parameter values were used for all but the first function block. Of course, as the measurement application is developed and debugged, various of the parameters may be adjusted as needed to tune the system as needed.

As FIGS. 6-9 illustrate, the plurality of function blocks corresponding to the sequence of functions are preferably included in a function block diagram, where the plurality of function block icons may be arranged to visually indicate the functionality of the measurement application. In other words, in one embodiment, a diagram including the function block icons of the specified functions is displayed, where the diagram visually indicates the functionality of the measurement application. In various embodiments, the diagram may be one or more of: a linear sequence, a data flow diagram, a tree diagram, and a dependency diagram. Note that in the embodiment of FIGS. 6-9, the function block diagram is presented as a vertical linear sequence of function blocks, where the respective functions are performed accordingly, although it should be noted that, as mentioned above, each of the functions may be executed in a substantially continuous manner.

Thus, in preferred embodiments, for each function in the sequence of functions, the method may include displaying an icon on the display in response to receiving respective user input specifying the function, where the icon is or includes a graphical representation of the function. As may be seen, in this example, the sequence of functions/function blocks includes a Create Signal function, an NI-FGen Arbitrary Wave Generator function, and an NI-Scope Acquire function, although it should be noted that any other functions may be used as desired.

It should also be noted, however, that although the diagram may be presented as a linear sequence, in some embodiments, the I/O relationships between the function blocks may not be linear. For example, non-linear data flow may be specified and indicated via input and output signal icons for the function blocks. In one embodiment, the function block diagram may be a data flow diagram, although in other embodiments, the function block diagram may not follow data flow semantics. For example, other flow protocols or semantics may be used, e.g., control flow, execution flow, etc., as desired. Additionally, in some embodiments, no lines or connections may be displayed connecting the function blocks, although in other embodiments, the function blocks may be connected by wires illustrating and/or implementing communication between the function blocks.

Note, however, that in some embodiments, no hardware devices may be used, e.g., in some simulation or modeling applications, or offline or post-processing projects that do not include any hardware blocks. The measured signals may, for example, originate from data logged on file, e.g., data may be "acquired" by the application from a file, rather than via a DAQ device (although the data may or may not have been originally acquired via a hardware device). Additionally, in some embodiments, the application or project may be a pure simulation project that does not require any input signal at all (neither from acquisition hardware nor from a data file).

Thus, in some embodiments, there may be no hardware function blocks in the measurement project or application. In other software only embodiments, the function blocks may operate to analyze (possibly including data or signal processing) data (or signals) that have already been acquired, e.g., digitized, and stored on a computer system, and so may not require the use of hardware devices.

In 504, the configuration of the measurement application may automatically be analyzed according to a plurality of rules specifying operation of the sequence of functions and the one or more hardware devices. In other words, the sequence of functions (possibly including any associated devices) may be analyzed with respect to configuration based on rules related to the operation of the sequence of functions and the hardware devices. In one embodiment, the automatically analyzing may include one or more of: analyzing at least one of the sequence of functions, analyzing parameter settings for the one or more hardware devices, and/or analyzing device specifications (e.g., parameter values) for the one or more hardware devices.

It should be noted that the analysis is performed with respect to user-provided selection of, configuration of, or attribute specifications for, the sequence of functions, and thus may be considered to be performed by a project configuration analyzer or "edit-related" analyzer, since all the configuration information analyzed is available at "edit-time" for the application. In other words, the analysis is directed to the configuration of the application and/or user input specifying such configuration. This is in contrast to analysis of "run-time" phenomena, which, as used herein, refers to analysis directed to signals or data produced during operation or execution of the sequence of functions, i.e., at run-time, e.g., an analysis that considers, for example, the nature of acquired signals received from a UUT during execution of the function sequence. Note, however, that while operating in continuous mode, the user may edit the sequence of functions, e.g., adding or removing function blocks, configuring function blocks, etc., while the sequence is running; and so the analyzer may analyze the data input by the user, as well as the resulting configuration of the function sequence, which, although the function sequence may be running, is still considered to be an configuration or edit-related analysis, since it is the configuration or edit-related aspects of the system being analyzed, as opposed to phenomena generated or received during or as a result of the run-time operation of the system.

For example, in one embodiment, the parameter settings of the measurement application (e.g., of the project), possibly including hardware parameters, and other high-level dependencies between the specified functions or function blocks may be analyzed according to the specified rules. In some embodiments, the rules may be part of, or associated with, the related functions, and so may be stored and managed as part of the functions and/or the development environment, e.g., as a set of files, or in a library, e.g., a DLL (dynamic linked library). Additionally or alternatively, the rules may be maintained separately, e.g., provided (e.g., shipped) as independent files, e.g., as a separate library, DLL, etc.

In some embodiments, a GUI tool (e.g., within the development environment, or external to the environment), e.g., a rule editor, may be provided whereby the user may create their own rules governing the operation of functions. Thus, the user may create their own rules for analyzing their tasks in accordance with both internal rules and "custom" rules. For example, in one exemplary embodiment, the rule editor may include a text window or field for specifying or writing a formula codifying the desired rule. In some embodiments, this formula window or field may be automatically populated via user-selection of elements in other windows. For example, the user may select various operations from lists, menus, or palettes, e.g., by clicking function names, logical operators, and so forth. Additionally or alternatively, the user may simply type desired items, e.g., function names and operations, directly into the window or field, e.g., in accordance with a specified convention or programming/logical language. In one embodiment, the text of the formula may be automatically checked for 'correctness', e.g., the syntactic (and type) validity of the statement may be determined, and any problems or errors may be indicated, e.g., erroneous or problem elements or statements may be underlined, highlighted, or otherwise indicated, as desired.

In some embodiments, the rule editor may include a parameter lookup window, whereby the user may view all the function blocks in the project, and their associated parameters, as well as the type and current values of the parameters. As indicated above, these various elements may be selectable for inclusion in the formula specification, e.g., by clicking, dragging and dropping, etc. In some embodiments, this information may be displayed in the form of a tree, although any other format may be used as desired. In some embodiments, the rule editor may also facilitate operation lookup, e.g., via a presented list of available functions, as well as a description of each operation, and the types of parameters they accept. For example, the user may activate a drop down list of operations, and select an operation, upon which a description of the operator and/or its use may be displayed, e.g., in a description field.

In 506, one or more errors in the measurement application may be automatically determined based on the analyzing of 504. The errors may include any condition or aspect of the measurement application (or associated hardware) that is non-workable or even sub-optimal, e.g., incompatible or non-optimal function or device use, inappropriate parameter values, and so forth. For example, automatically determining one or more errors may include determining one or more parameter conflicts of the sequence of functions and/or the one or more hardware devices. As another example, in an embodiment where at least two functions of the sequence of functions have a specified dependency, automatically analyzing the measurement application may include analyzing the at least two functions with respect to the specified dependency, and automatically determining one or more errors may include determining improper cooperative use of the at least two functions based on the specified dependency.

As indicated above, in some embodiments, the method may detect sub-optimal function/device use or configurations in the measurement application. For example, in an embodiment where two or more of the sequence of functions are specified to operate cooperatively, automatically analyzing the measurement application may include analyzing the two or more functions with respect to the specified cooperative operation, and automatically determining one or more errors may include determining one or more settings for the two or more functions resulting in sub-optimal cooperative operation of the two or more functions. As a further example, automatically analyzing the measurement application may include analyzing the sequence of functions and/or the one or more hardware devices with respect to the specified task, and automatically determining one or more errors may include determining that the sequence of functions and/or the one or more hardware devices are sub-optimal for performing the specified task. Of course, any other errors or types of errors may be determined as desired, the above errors being exemplary only.

In 508, error information regarding the one or more errors may be displayed on a computer display, where the error information is usable to modify the measurement application to correct the one or more errors. The error information may include any information related to the errors that may be useful in correcting the error. For example, in one embodiment, the error information may include one or more of: identification information for the one or more errors, descriptive information regarding the one or more errors, and/or one or more suggested actions to correct the one or more errors.

Figure 10:
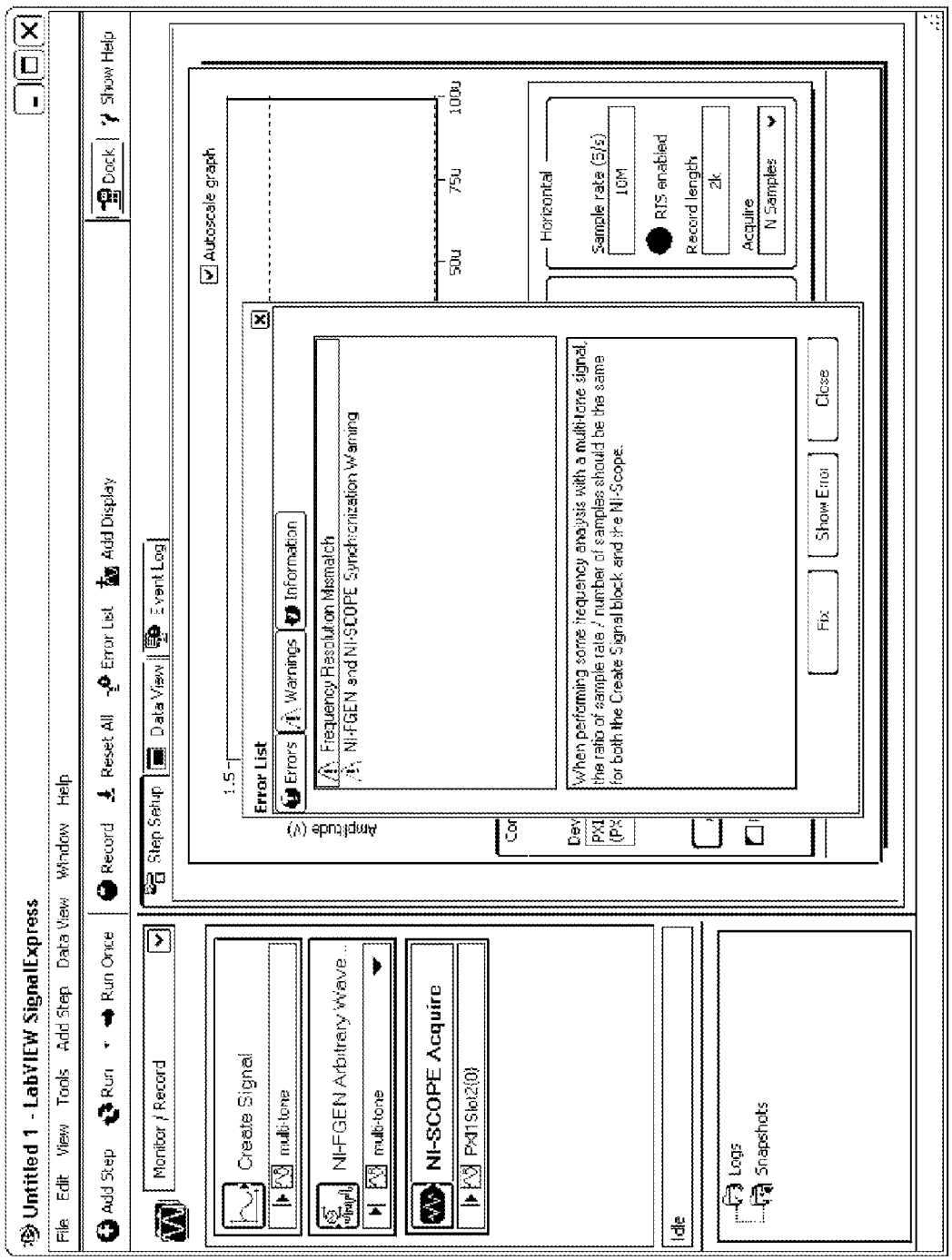
FIG. 10 illustrates display of error information for the measurement application, according to one embodiment.

FIG. 10 is a screenshot of the GUI of FIGS. 6-9 with a pop-up error list or dialog displaying error information, although it should be noted that the error information may be displayed in any of a variety of ways, e.g., in an error window of the GUI, or any other means desired. In this example embodiment, the project analyzer was running as a background process during the specification/implementation of the measurement application, checking the project/application after each action was performed, e.g., after each function was specified and/or configured. Upon detection of an error by the analyzer, an "Error List" icon in the GUI toolbar was enabled, and upon activation by the user (e.g., upon the user clicking on the icon), the error list dialog indicating current problems with the project was displayed.

As FIG. 10 shows, the analyzer has determined two errors. First, it warns that there is a Frequency Resolution Mismatch between the Create Signal and the NI-Scope acquisition functions. More specifically, the analyzer determined that by generating a multi-tone signal and reacquiring it, a frequency analysis task was most likely performed on the UUT, and that the frequency resolution (sample rate/record length) for the Create Signal and the NI-Scope Acquire functions should match.

In some embodiments, the method may include receiving user input modifying the measurement application to correct the one or more errors in response to displaying the error information. For example, referring again to FIG. 10, in this embodiment, the dialog also displays options (buttons at the bottom of the dialog) that may allow the user to invoke an automatic solution for the problem (a Fix button), invoke the configuration page to fix the problem (a Show Error button), or dismiss the dialog (a Close button). Note that the Fix and Show Error functionalities may have some inherent ambiguity. For example, because every rule is based on the interaction of multiple functions, it may be ambiguous as to where the problem should be corrected. Thus, in some embodiments, the author of the rule may specify or provide a potential or candidate approach or action to correct the problem (as well as indicating which function should be corrected) for these buttons to operate on. In one embodiment, hyperlinks may be provided that may perform a "go to" operation for each hyperlinked function, where each function may have a respective independent 'Fix' option. In some embodiments, the dialog or list may be moved off to the side of the GUI, and the user may continue to work, using the displayed information as a reference.

In one embodiment, the method may include automatically modifying the measurement application to correct the one or more errors in response to said determining one or more errors. For example, as described above, the measurement application may be automatically corrected in response to user input, e.g., in response to the user pressing a "Fix" button. Alternatively, in some embodiments, the measurement application may be automatically corrected without invocation of the corrective action by the user. In a further embodiment, the user may correct the problem or error manually, possibly based on hints or suggestions provided by the analyzer. In yet another embodiment, the method may include suggesting one or more functions to replace at least one function in the sequence of functions, or even suggesting a new sequence of functions to replace the entire sequence of functions. In other words, the method may suggest replacing the current sequence entirely, or replacing at least a portion of the sequence with alternative function blocks.

Once the one or more errors are corrected, the measurement application may be executed to perform the task.

Other Embodiments

It should be noted that the method elements described above may be performed in any of a variety of ways. For example, in one embodiment, the user may specify all the functions in the sequence, and then the analyzer may analyze the sequence and determine any errors in the application. This approach may be considered a "batch" approach. Alternatively, the function specification and analysis, and the determination of errors may be performed per function, e.g., as each function is specified. Thus, receiving user input specifying the measurement application (502) may include: for each function in the sequence of functions, receiving respective user input specifying the function, and the automatically analyzing may be performed after each receiving respective user input specifying the function in the sequence of functions. The automatically determining one or more errors and displaying error information may be performed for at least one function in the sequence of functions based on the analysis, e.g., as each function is included in the measurement application. Thus, as each function is specified for inclusion in the measurement application (and configured), the analyzer may analyze that function (and any preceding functions), and determine any errors in the application so far. Thus, the analysis and determination of errors may be a substantially continuous process, reanalyzing the application as each change or addition is made. Note that this approach may allow the user to avoid having to discard large portions of work because of errors in the initial portions of the application.

In some embodiments, for each function in the sequence of functions, each function for which no error was determined may be performed in response to receiving respective user input specifying the function. In other words, as mentioned above, the measurement application may be executed in a "continuous" mode, where each function begins operating as soon as it is included in the application if no errors are determined.

As noted above, in preferred embodiments, receiving user input specifying the measurement application (502) may include receiving the user input to a graphical user interface (GUI) of an application development environment. In various embodiments, the automatic analysis (504) and error determination (506) may be performed via one or more of: the application development environment, or a software tool coupled to the application development environment. In other words, the software (e.g., analyzer) may be an inherent part of the application development environment, or an extension, e.g., a plug-in, to the application development environment, or a wizard or a stand-alone software tool. In other words, the analyzer (or functional equivalent) may be part of the development environment, or a separate software tool. Similarly, displaying error information regarding the one or more errors on a computer display (508) may be performed via one or more of: the GUI of the application development environment, a GUI of the software tool coupled to the application development environment, or a plurality of just-in-time advices, e.g., dynamic (and automatic) pop-up messages.

In some embodiments, the method may perform functionality not directly related to errors. For example, in one embodiment, the method may include automatically analyzing the sequence of functions to determine a task, and automatically proposing task-oriented advice to aid in implementing the task. In other words, the method (e.g., the analyzer) may try to determine what the user is attempting to accomplish based on the user-specified sequence of functions, and provide (presumably) helpful advice as to how best to proceed. For example, automatically proposing task-oriented advice may include one or more of: suggesting invocation of a task-specific software tool or project template to help the user implement the task, suggesting one or more additional functions to help the user implement the task, suggesting one or more devices to help the user implement the task, automatically modifying the sequence of functions, suggesting one or more functions to replace at least one function in the sequence of functions, or even suggesting a new sequence of functions to replace the entire sequence of functions.

For example, in some "project template" embodiments, e.g., where the user may use a project template wherein many if not all configuration parameters/specifications may be provided with default values, dependent parameters may be "bound" together, so that when a parameter value in one of the function blocks is changed, that parameter, or a dependent parameter, is automatically updated in one or more other function blocks, e.g., the 'Frequency Resolution' (sample rate/record length) requirements of a multi-tone project template. Thus, modifications to configuration information in the project template may be automatically propagated throughout the template. Thus, more specifically, in some embodiments, the method described above may include receiving a project template specifying a default configuration for at least a portion of the sequence of functions. The user input specifying the sequence of functions may include user input modifying a value of at least one parameter of one of the functions in the sequence of functions. The method may further include automatically updating values of one or more parameters of at least one other function in the sequence of functions that are dependent on the at least one parameter.

In embodiments where the task-oriented advice includes suggesting invocation of a task-specific software tool to help the user implement the task, the method may include invoking the task-specific software tool in response to user input, and the task-specific software tool modifying the sequence of functions in response to user input. For example, the task-specific software tool may be a wizard that is particularly suitable for specifying and developing a measurement application directed to the determined task (which presumably is the same task or similar to the task that the user has in mind). Thus, for example, in a case where the user has specified one or more data acquisition functions, the method (e.g., the analyzer) may determine that the task is a data acquisition (DAQ)/analysis task, and may suggest invocation of a DAQ wizard that may be operable to lead or guide the user through the process of specifying a measurement application to perform the task, e.g., possibly suggesting functions, configuration, and/or architecture (e.g., function order), for the measurement application. For example, a list, menu, or palette, of functions related to DAQ may be presented for selection by the user, e.g., filtering functions, signal conditioning functions, etc.

In some embodiments, the task-specific software tool may be invoked automatically, without requiring invocation by the user. Similarly, as indicated above, in some embodiments, the method may include automatically modifying the sequence of functions (including possibly replacing one or more functions with other functions), i.e., without user input specifying the modifications. However, in this case, the method preferably further includes notifying the user of any changes made, possibly with the option to undo the changes.

In another embodiment, a project template may be invoked and/or instantiated, where the project template is specifically directed to the determined task, e.g., that focuses on the specific needs for the project under development. For example, the project template may include one or more default functions (e.g., with default configurations) typical of the determined task, e.g., in the case of a DAQ task, the project template may by default include an acquisition function block. The project template may thus provide a starting point for the application development that may save the user time and effort. In some embodiments, e.g., when the task is well-defined, the project template may substantially implement the task, where the user may (or may not) simply "tweak" the configuration or otherwise make fairly minor changes or additions to the measurement application to achieve the desired functionality.

Figure 11:
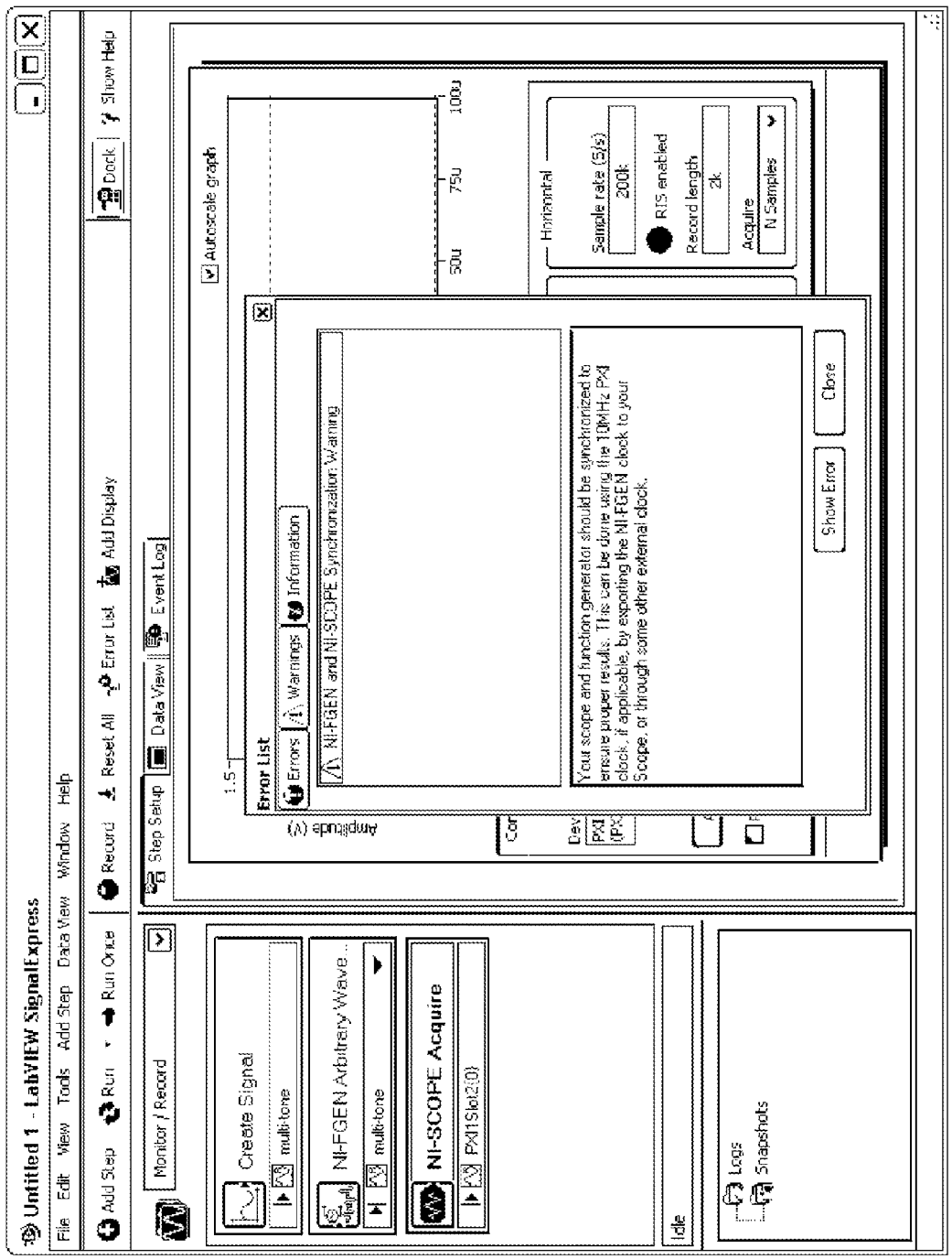
FIG. 11 illustrates an updated display of error information for the measurement application, according to one embodiment.

Referring back to FIG. 10, once the "Frequency Resolution Mismatch" error is corrected, e.g., by the user pressing the "Fix" button, that error indication may be removed from the error list, leaving the other error displayed. This feature is illustrated by FIG. 11, where, as may be seen, the remaining error relates to proper synchronization between the NI-FGen device and the NI-Scope device, as indicated by the error name and the explanation presented in the text window or field below. After correcting this remaining error, the dialog is empty, and thus may be removed.

Figure 12:
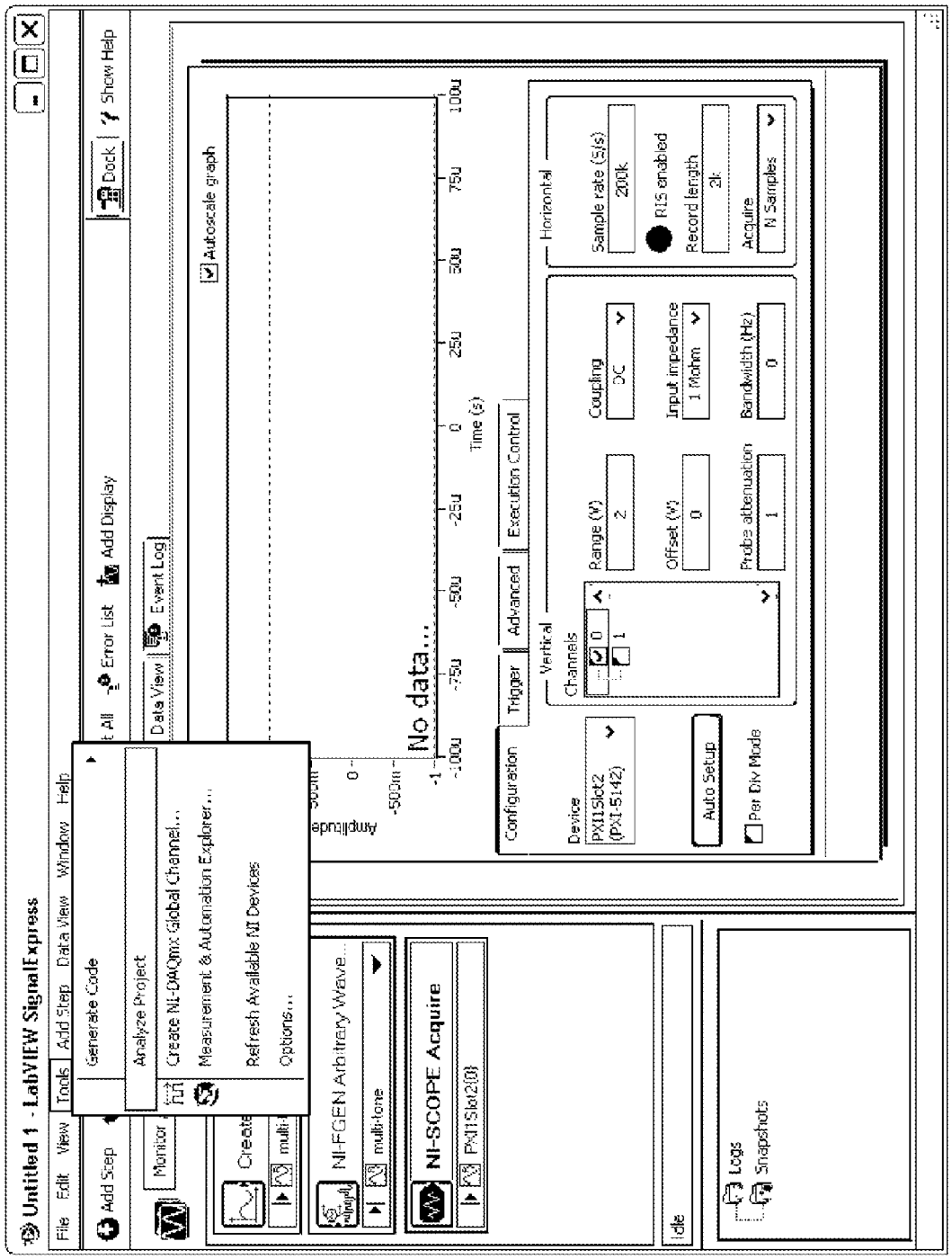
FIG. 12 illustrates user-invocation of the project analyzer, according to one embodiment.

In one embodiment, the analyzer does not need to be on (active) all the time. If turned off, the user may manually invoke the above-described analysis, e.g., via an option in the tools menu, where selecting this option invokes the above-described analysis and error determination, and subsequent display of the error dialog indicating any errors determined by the analyzer. One embodiment of this feature is illustrated by FIG. 12, which shows the user invoking a tools menu in the GUI, and selecting the "Analyze Project" option from the menu, thereby invoking the above analysis. In some embodiments, if no errors are found, a message to that effect may be presented to the user.

In some embodiments, the analyzer may itself be configurable, e.g., by the user. For example, in one exemplary embodiment, the analyzer may be configured to check hardware setting compatibility with selected hardware devices. An example of a corresponding error warning may be: "The NI-5411 generator device cannot sample at 100 MSamples/s, use an NI-5421 device instead or reduce Sample Rate to 40 MSamples/s". As another example, the analyzer may be configured to check global triggering conditions. Examples of error warnings for this case may be: "Circular dependencies" or "Do not use an analog trigger when performing swept measurements!" Of course, these configuration options and errors are meant to be exemplary only, and are not intended to limit the configuration options or errors to any particular set of options or errors.

In some embodiments, the analyzer may include two portions: an analyzer engine, that may, for example, be part of the development environment that manages the operation steps needed to perform the requested project analysis; and a database of information describing a model (search) tree with descriptions of valid/invalid situations.

In one embodiment, when a project analysis is completed, and the results (e.g., errors) are presented to the user, the user may be given a chance to "accept" or "ignore" a recommendation, and the project/application may be automatically updated to reflect the selected corrections. In a case where a suggested correction results in another conflict elsewhere, the analysis may be iterative, where the corrections and analysis are repeated until the errors are resolved, or the user decides to correct the error(s) in a different manner than suggested.

In various embodiments, the project analyzer may operate at different levels, such as, for example:

a "single function" level, e.g., directed to parameter conflicts or, as mentioned above, settings incompatible with selected hardware specific to single functions;

a "dependant functions" level, e.g., where two or more functions have a well-defined dependency that can easily be analyzed, e.g., "If the Create Signal function returns a sine tone, the Arbitrary Waveform Generator device function (ARB) should enable the reconstruction filters";

a "project level", e.g., directed to issues more complex than simple dependant functions, e.g., "You are only sweeping up to 10 kHz so consider reducing your generation/acquisition sample rate" or, "You are sweeping down to 0.1 Hz but have ac-coupling enabled in your acquisition device", or "You are measuring the rms value of a swept sine; consider using the Tone Extraction function instead for more accurate results"; and/or a "global overview" level, directed to the functionality or operability of the entire project, where, for example, the entire project may even be scrapped and a suggestion to replace it with an entirely different measurement method, e.g., "You are measuring a frequency response using a linear frequency sweep, consider a non-sweeping Fast Fourier Transform (FFT)-based measurement instead for increased measurement speed".

Exemplary Use Cases

The following are example use cases demonstrating various aspects of embodiments of the present invention.

Single Function Level

Functions are preferably designed to avoid options that can conflict, e.g., by disabling or hiding the related controls for such options. For example in a Subset and Resample function, one may not be allowed to select 'Open interval' for a subset unless in 'Optimized for single record' mode.

Numerical control values can easily conflict, e.g., requesting a sine tone frequency higher than half the sample rate (conflicting with the so-called Nyquist criterion). However in cases like this the problem may be addressed immediately at edit time, e.g., the frequency may be coerced and a warning returned.

Hardware functions may offer standard options as supported by the driver (although it should be noted that not all features are supported by all hardware devices). An illegal parameter value may not be identified until the project is run. The analyzer may be able to determine such issues if it has access to the device specifications (min/max range, min/max sample rate, supported triggering mode etc.).

Dependant Functions Level

Example 1

A classic two functions situation composed of a Create Signal and an NI-FGen (Arbitrary Waveform Generator) function; some of the parameter combinations may be true error situations, and an error may be returned at run time, for example:

The Create Signal Sample Rate value is not supported by the used NI-FGen generation device The Create Signal Record length value is not supported by the used NI-FGen generation device.

Other situations may not involve actual operating errors, but may result in bad measurement results, and thus still be considered by the project analyzer, for example:

The Create Signal is exporting a sine tone signal to the NI-FGen generation device but the NI-FGen reconstruction filter is not enabled.

The Create Signal is exporting a square wave signal to the NI-FGen generation device but the NI-FGen reconstruction filter is enabled (a recommendation)

The NI-FGen is generating the same signal repeatedly but the signal exported by the Create Signal function does not have an integer number of periods (N-periods is not checked). This will result in phase discontinuities in the generated periodic signal.

Example 2

An acquired signal is passed to a Power Spectrum function. An example error may be:

Power Spectrum: Vector averaging is selected but the acquisition is finite and not triggered.

Project Level

Project level analysis is a more difficult task. The purpose is to analyze an entire project and identify bad measurement conditions, and return a list of recommendations to the user. Note that at edit-time proper, e.g., when the system is not running in continuous mode, the analyzer can only 'assume' that a specific measurement will be performed, which can result in misinterpretations of the purpose of the project. For example the project may include the generation of a sine tone as well as some acquisitions, in which case it is likely that the acquisition returns a periodic signal that is somehow correlated with the generation; however, this may not be the case at all. For example, the sine tone may be used to heat up a unit under test (UUT) while the acquisition measures the temperature of the UUT. However there are parameter combinations that can be used to predict problems that may affect the measurement results.

Example 1

A frequency sweep from 1 Hz to 1 kHz where the signal is generated by an Arb device (i.e., an arbitrary waveform generator, e.g., NI-FGen), acquired with a Digitizer device (e.g., NI-Scope), and measured with an Amplitude and Level function may result in the following issues:

The Create Signal sample rate is unnecessarily high and/or block size is unnecessarily large (memory and performance issues);

The Digitizer device is not acquiring enough samples to measure the lowest frequencies in a reliable way;

The Digitizer device is AC-coupled, which will affect the accuracy at low frequency (10 Hz and below);

Digitizer device: The Trigger position in time is set to the middle of the acquisition record (50%) and the trigger is controlled by the start of the generation;

The Amplitude and Level function measures the RMS value of a sine tone but with the selected acquisition block size, a weighting window should be selected—(note that this error involves information from three different function blocks).

Example 2

A frequency sweep where the 'N periods' check box is checked but where the sweep output uses the sweep input frequency as x-axis, may result in the following issues:

Sweep Function the Sweep Output x-axis is chosen to be the 'Frequency' of Create Signal; it should be the coerced frequency Thus, the particular types of analysis and errors determined may depend on the level of operation of the analyzer.

Examples of Project Analyzer Engine Basic Rules

The following are example rules for analysis by the analyzer. Note that these rules are meant to be exemplary only, and are not intended to limit the type, form, or scope of rules used.

Description: "If the Create Signal step returns a sine tone, the ARB (arbitrary waveform generation) step should enable the reconstruction filters".

---

Rule:
  mode = ProjectAnalysis
  Block = Arb
  if anyInputSource ="Create Signal"
  if inputSource parameter "type" == "sine wave"
  if parameter "Enable Filters" != true
  display message "Needs filters for good sine tones".
Description: "You are only sweeping your signal frequency to less than ¹⁄₁₀ of your sample rate so consider reducing your generation rate".
Rule:
  mode = ProjectAnalysis
  if loopController == sweep
  if loopController parameter source = CreateSignal.Frequency
  if loopController parameter "Max" <= 0.1 * CreateSignal.SampleRate or loopController parameter "Min" <= 0.1 * CreateSignal.SampleRate
  display message "Consider reducing your sample rate".
Description: "You are sweeping your signal frequency down below 10 Hz but have ac-coupling enabled in your acquisition".
Rule:
  mode = ProjectAnalysis
  if loopController == sweep
  if if loopController parameter source = CreateSignal.Frequency
  if loopController parameter "Max" < 10 or "Min"< 10
  if parameter Digitizer.AC_coupling == true
  display message "Are you sure you want ac-coupling to be enabled when measuring signals below 10 Hz?".

---

Thus, various embodiments of the above system and method may facilitate the development and debugging of measurement applications.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for creating a measurement application, comprising:
   receiving user input specifying a sequence of functions comprising an executive sequence implementing a measurement application, wherein the sequence of functions are executable on a host device to perform a specified task utilizing one or more hardware devices by controlling or communicating with the one or more hardware devices, and wherein the user input further indicates the one or more hardware devices;
   automatically analyzing configuration of the measurement application according to a plurality of rules specifying operation of the sequence of functions and the one or more hardware devices, wherein said automatically analyzing is performed based on configuration information available at edit time, wherein the plurality of rules comprise one or more Boolean expressions specifying sub-optimal or conflicting conditions of the functions of the executive sequence or the one or more hardware devices based on the configuration information;
   automatically determining one or more errors in the measurement application based on said analyzing;
   displaying error information regarding the one or more errors on a computer display, wherein the error information is usable to modify the measurement application to correct the one or more errors.

2. The method of claim 1, further comprising:
   receiving user input modifying the measurement application to correct the one or more errors in response to said displaying error information.

3. The method of claim 1, further comprising:
   automatically modifying the measurement application to correct the one or more errors in response to said determining one or more errors.

4. The method of claim 1, further comprising:
   executing the measurement application to perform the task after correction of the one or more errors.

5. The method of claim 1,
   wherein said receiving user input specifying the sequence of functions comprising an executive sequence implementing the measurement application comprises:
   for each function in the sequence of functions, receiving respective user input specifying the function;
   wherein said automatically analyzing is performed after each said receiving respective user input specifying the function in the sequence of functions; and
   wherein said automatically determining one or more errors and said displaying error information are performed for at least one function in the sequence of functions.

6. The method of claim 5, further comprising:
   for each function in the sequence of functions, performing each function for which no error was determined in response to said receiving respective user input specifying the function.

7. The method of claim 1, the method further comprising:
   for each function in the sequence of functions, displaying an icon on the display in response to said receiving respective user input specifying the function, wherein the icon comprises a graphical representation of the function.

8. The method of claim 1, wherein said receiving respective user input specifying the function comprises:
   displaying configuration options for the measurement application, wherein the configuration options are displayed in accordance with the plurality of rules; and receiving user input selecting one or more options for the measurement application.

9. The method of claim 1, wherein said automatically analyzing comprises one or more of:
analyzing at least one of the sequence of functions;
analyzing parameter settings for the one or more hardware devices; or
analyzing device specifications for the one or more hardware devices.

10. The method of claim 1, wherein said automatically determining one or more errors comprises:
determining one or more parameter conflicts of the sequence of functions or the one or more hardware devices.

11. The method of claim 1,
wherein at least two functions of the sequence of functions have a specified dependency;
wherein said automatically analyzing comprises analyzing the at least two functions with respect to the specified dependency; and
wherein said automatically determining one or more errors comprises determining improper cooperative use of the at least two functions based on the specified dependency.

12. The method of claim 1,
wherein two or more of the sequence of functions are specified to operate cooperatively;
wherein said automatically analyzing comprises analyzing the two or more functions with respect to the specified cooperative operation; and
wherein said automatically determining one or more errors comprises determining one or more settings for the two or more functions resulting in sub-optimal cooperative operation of the two or more functions.

13. The method of claim 1,
wherein said automatically analyzing comprises analyzing the sequence of functions and/or the one or more hardware devices with respect to the specified task; and
wherein said automatically determining one or more errors comprises determining that the sequence of functions and/or the one or more hardware devices are sub-optimal for performing the specified task.

14. The method of claim 1, wherein the error information comprises one or more of:
identification information for the one or more errors;
descriptive information regarding the one or more errors; or
one or more suggested actions to correct the one or more errors.

15. The method of claim 1,
wherein said receiving user input specifying a sequence of functions comprises receiving the user input to a graphical user interface (GUI) of an application development environment; and
wherein said automatically analyzing the configuration of the measurement application and said automatically determining one or more errors in the measurement application are performed via one or more of:
the application development environment; or
a software tool coupled to the application development environment.

16. The method of claim 15, wherein the software tool comprises one or more of:
a wizard;
a plug-in to the application development environment; or
a stand-alone software tool.

17. The method of claim 15, wherein said displaying error information regarding the one or more errors on a computer display is performed via one or more of:
the GUI of the application development environment;
a GUI of the software tool coupled to the application development environment; or
a plurality of just-in-time advices.

18. The method of claim 1, further comprising:
automatically analyzing the sequence of functions to determine a task; and
automatically proposing task-oriented advice to aid in implementing the task.

19. The method of claim 18, wherein said automatically proposing task-oriented advice comprises one or more of:
suggesting invocation of a task-specific software tool to help the user implement the task;
suggesting one or more additional functions to help the user implement the task;
suggesting one or more devices to help the user implement the task;
automatically modifying the sequence of functions;
suggesting one or more functions to replace at least one function in the sequence of functions; or
suggesting a new sequence of functions to replace the sequence of functions.

20. The method of claim 19, further comprising:
invoking the task-specific software tool in response to user input; and
the task-specific software tool modifying the sequence of functions in response to user input.

21. The method of claim 1, wherein the measurement application comprises at least one data acquisition function and at least one analysis function.

22. The method of claim 1, wherein the measurement application is executable to perform one or more of:
one or more control operations;
one or more automation operations; or
one or more modeling or simulation operations.

23. The method of claim 1, further comprising:
receiving a project template specifying a default configuration for at least a portion of the sequence of functions, wherein the user input specifying the sequence of functions comprises user input modifying a value of at least one parameter of one of the functions in the sequence of functions; and
automatically updating values of one or more parameters of at least one other function in the sequence of functions that are dependent on the at least one parameter.

24. A non-transitory computer-accessible memory medium that stores program instructions for creating a measurement application, wherein the program instructions are executable by a processor to:
receive user input specifying a sequence of functions comprising an executive sequence implementing a measurement application, wherein the sequence of functions are executable on a host device to perform a specified task utilizing one or more hardware devices by controlling or communicating with the one or more hardware devices, including at least one data acquisition function, and at least one analysis function, and wherein the user input further indicates the one or more hardware devices;
automatically analyze configuration of the measurement application according to a plurality of rules specifying operation of the sequence of functions and the one or more hardware devices, wherein said automatically analyzing is performed based on configuration information available at edit time, wherein the plurality of rules comprise one or more Boolean expressions specifying sub-optimal or conflicting conditions of the functions of the executive sequence or the one or more hardware devices based on the configuration information;

automatically determine one or more errors in the measurement application based on said analyzing; and display error information regarding the one or more errors on a computer display, wherein the error information is usable to modify the measurement application to correct the one or more errors.

25. A system for creating a measurement application, comprising:

a computer system, comprising:
  a processor;
  a memory medium coupled to the processor; and
  a display device coupled to the processor and memory medium; and
one or more hardware devices coupled to the computer system;
wherein the memory medium stores program instructions executable by the processor to:
  receive user input specifying a sequence of functions comprising an executive sequence implementing a measurement application, wherein the sequence of functions are executable on a host device to perform a specified task utilizing one or more hardware devices by controlling or communicating with the one or more hardware devices, including at least one data acquisition function, and at least one analysis function, and wherein the user input further indicates the one or more hardware devices;
  automatically analyze configuration of the measurement application according to a plurality of rules specifying operation of the sequence of functions and the one or more hardware devices, wherein said automatically analyzing is performed based on configuration information available at edit time, wherein the plurality of rules comprise one or more Boolean expressions specifying sub-optimal or conflicting conditions of the functions of the executive sequence or the one or more hardware devices based on the configuration information;
  automatically determine one or more errors in the measurement application based on said analyzing; and
  display error information regarding the one or more errors on a computer display, wherein the error information is usable to modify the measurement application to correct the one or more errors.

* * * * *